April 29, 1958   H. J. CHALL ET AL   2,832,534
CONTROL MEANS FOR LISTING ADDING MACHINE
Filed June 28, 1954   17 Sheets-Sheet 1

April 29, 1958  H. J. CHALL ET AL  2,832,534
CONTROL MEANS FOR LISTING ADDING MACHINE
Filed June 28, 1954  17 Sheets-Sheet 2
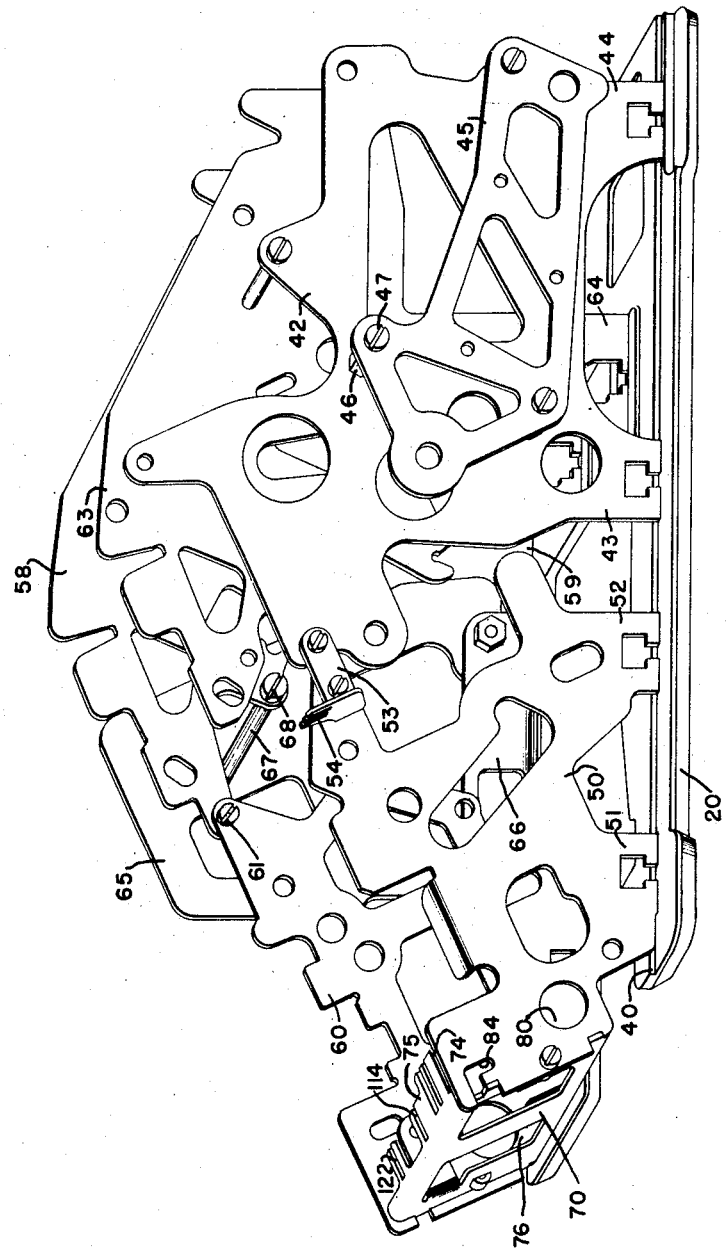
FIG_2

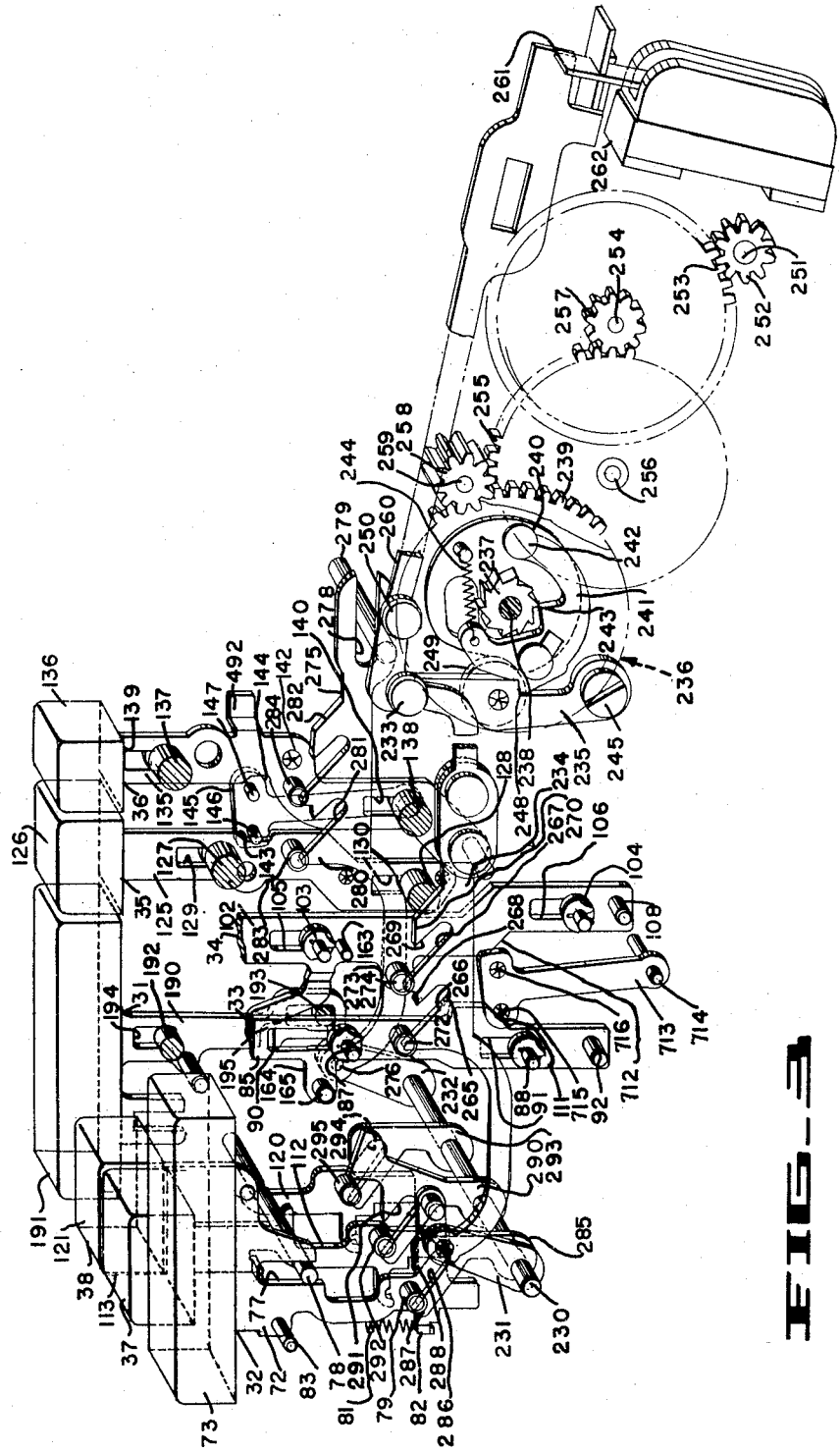

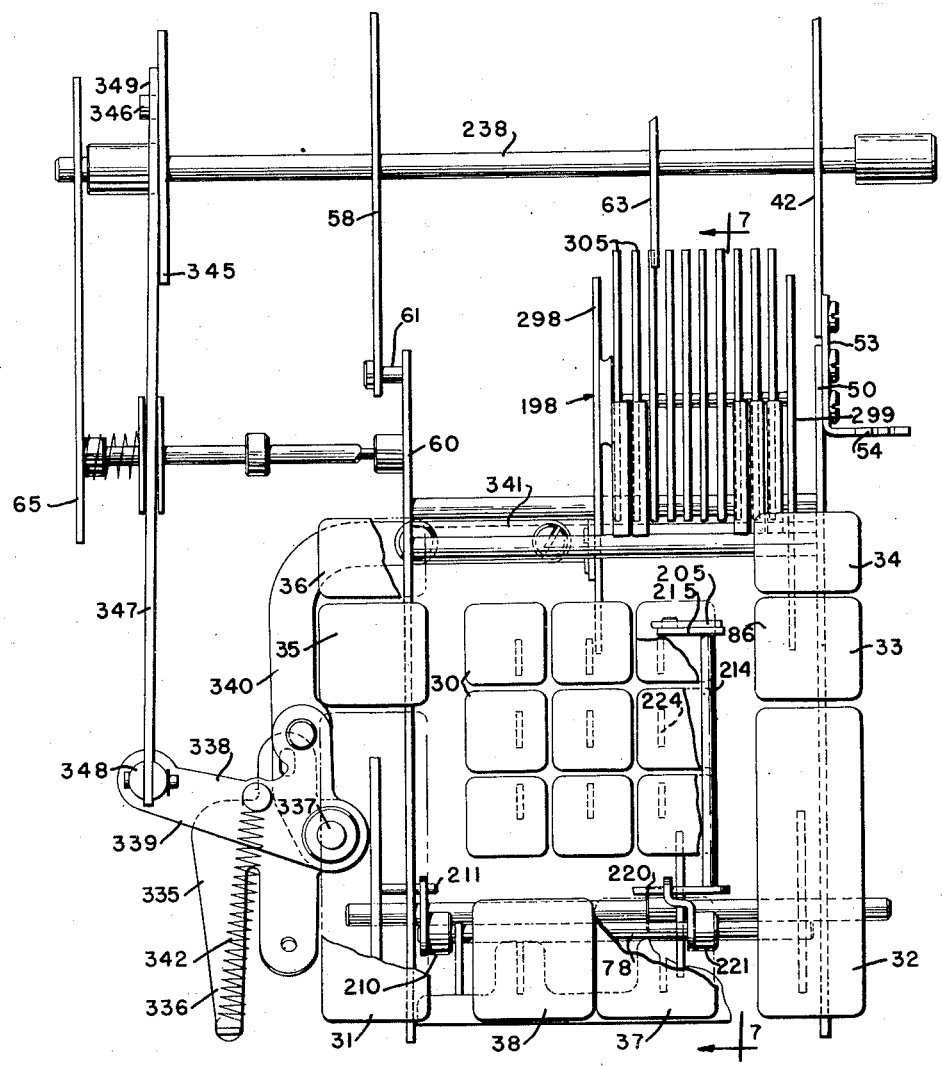
FIG_4

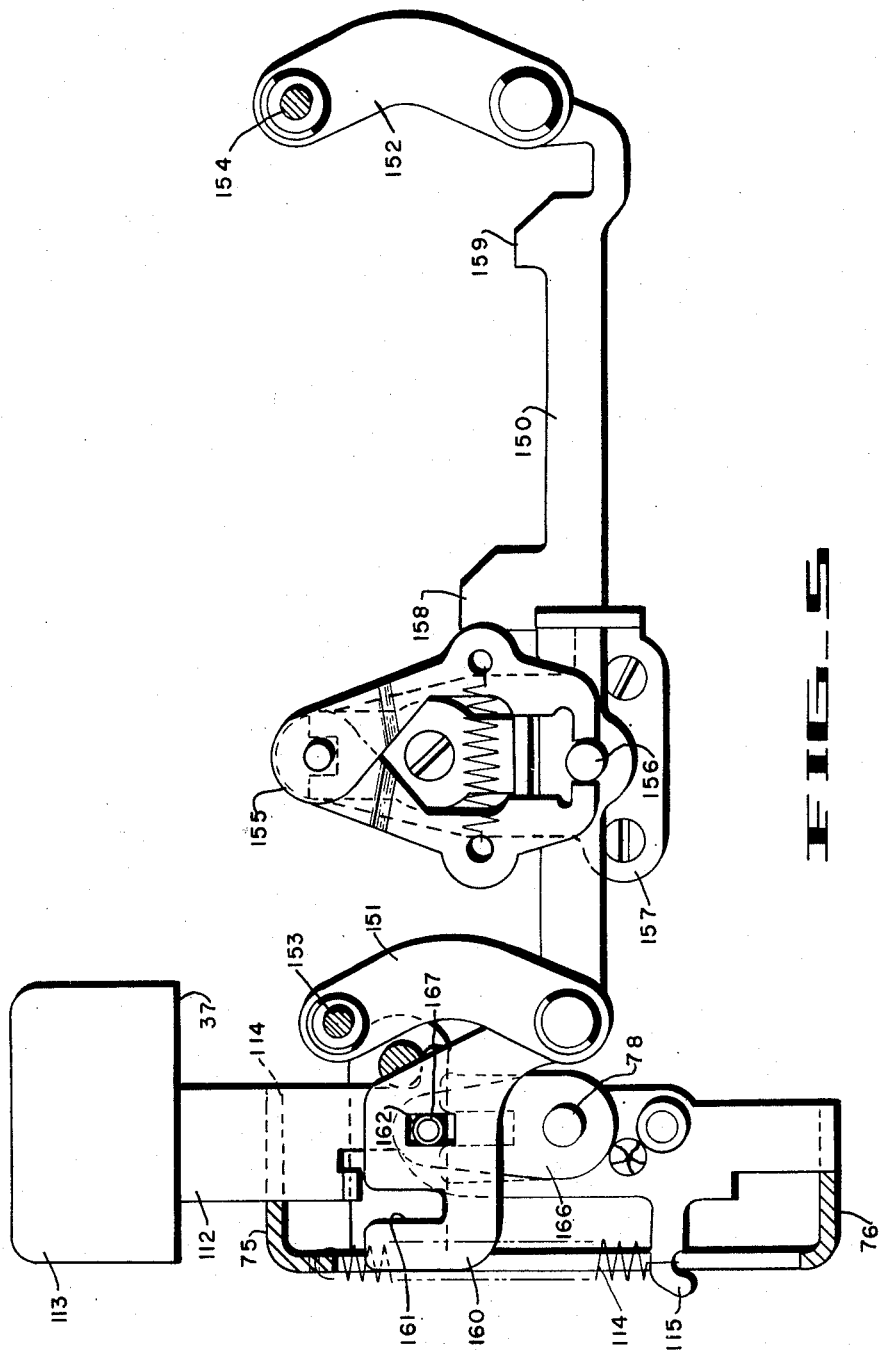

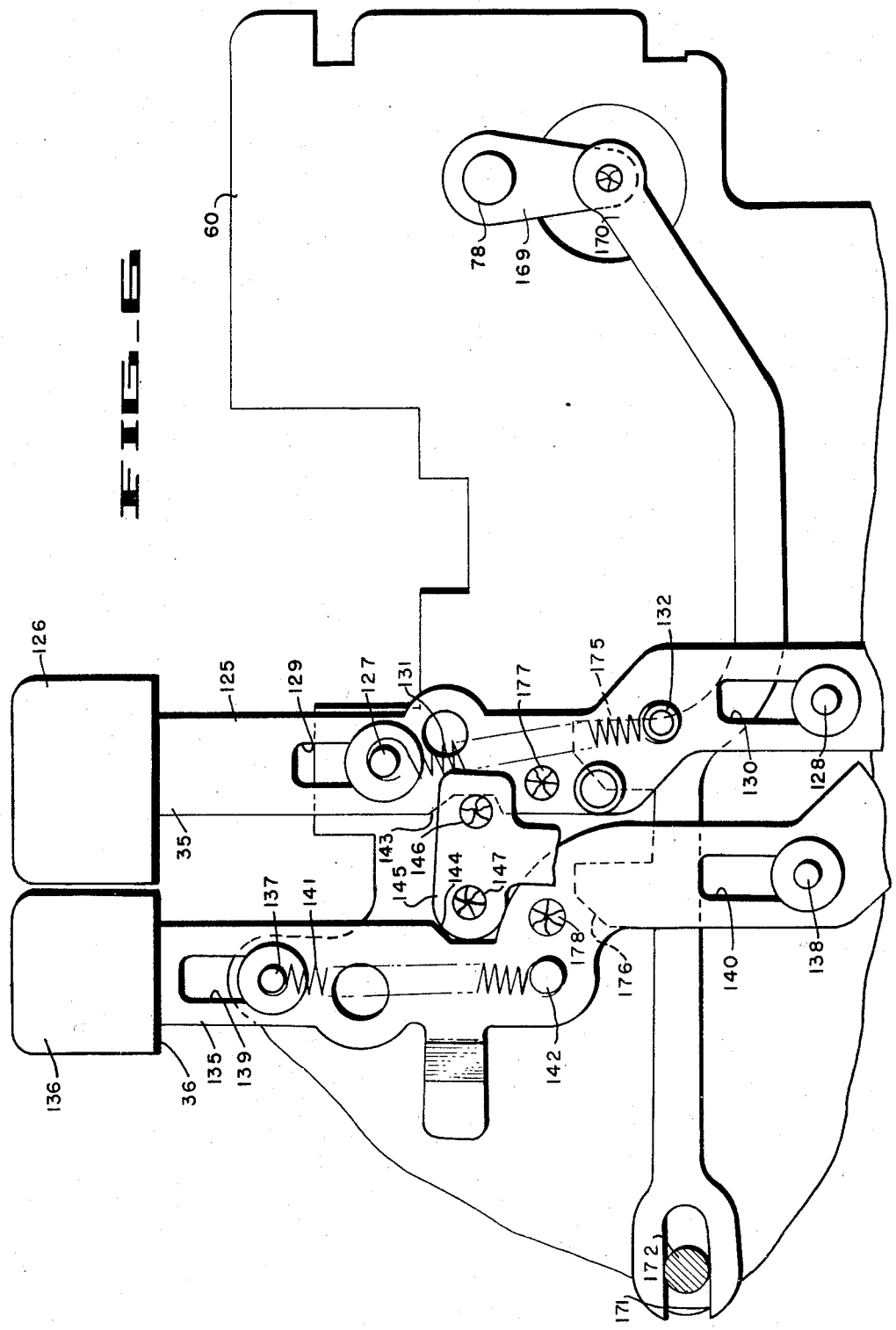

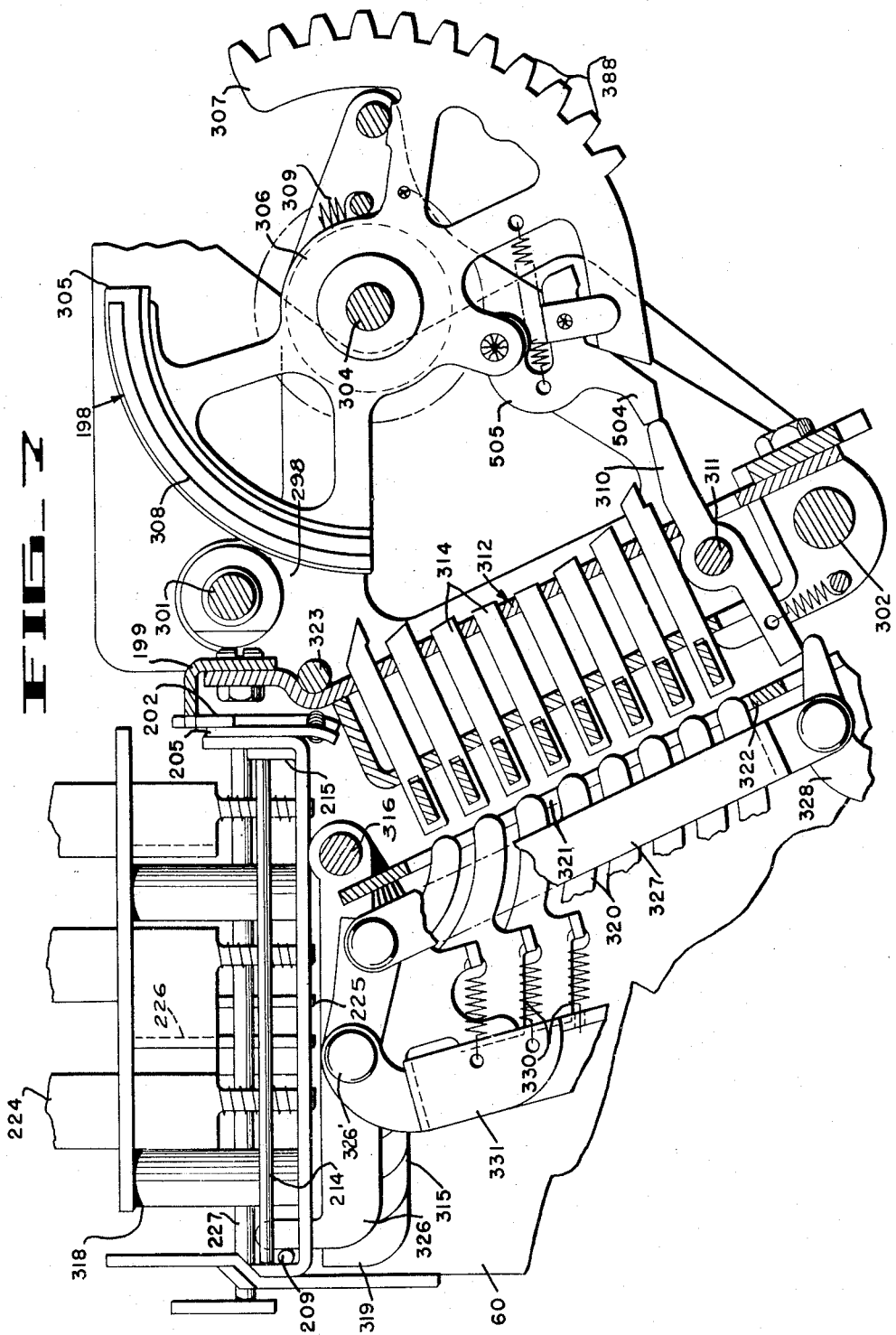

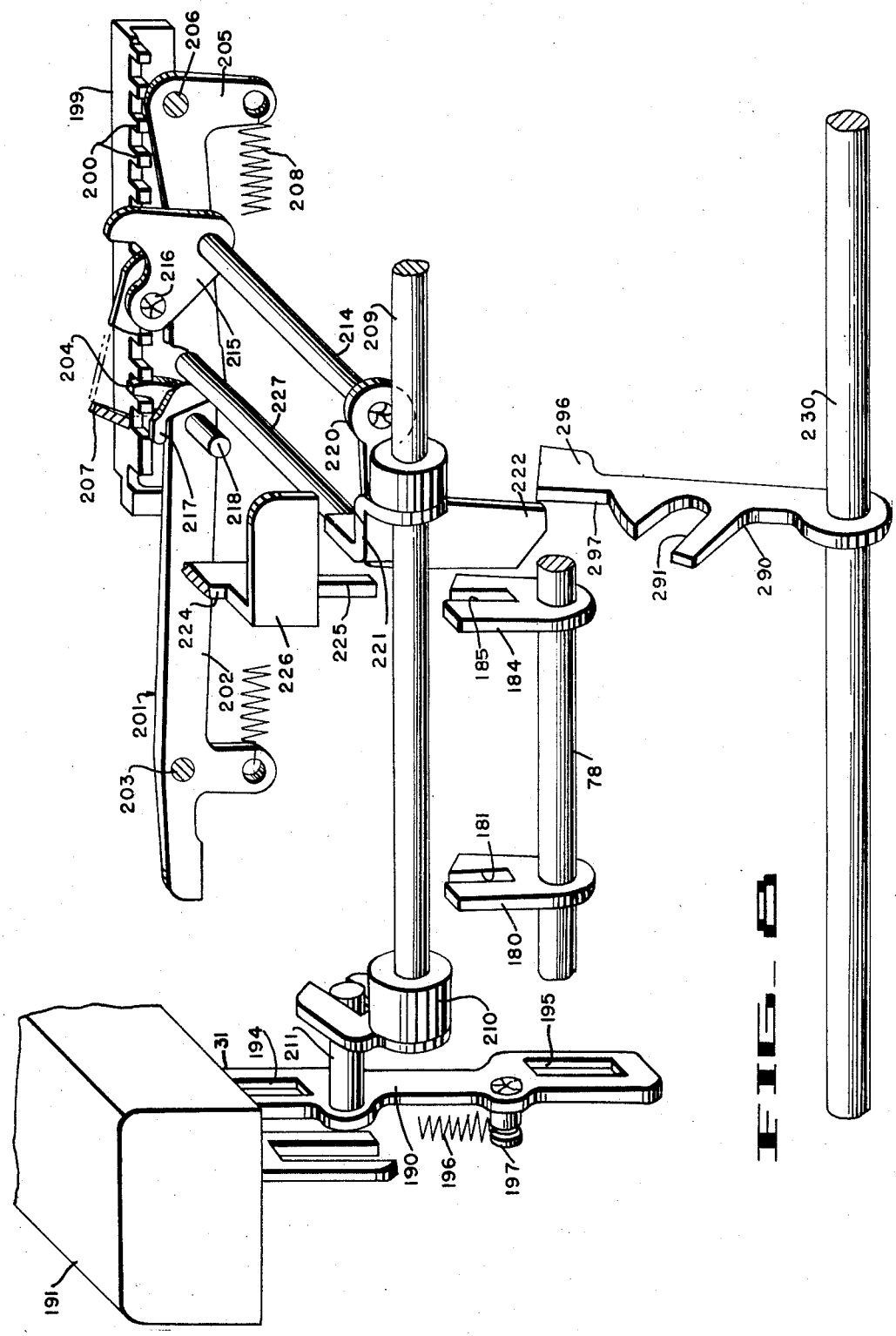

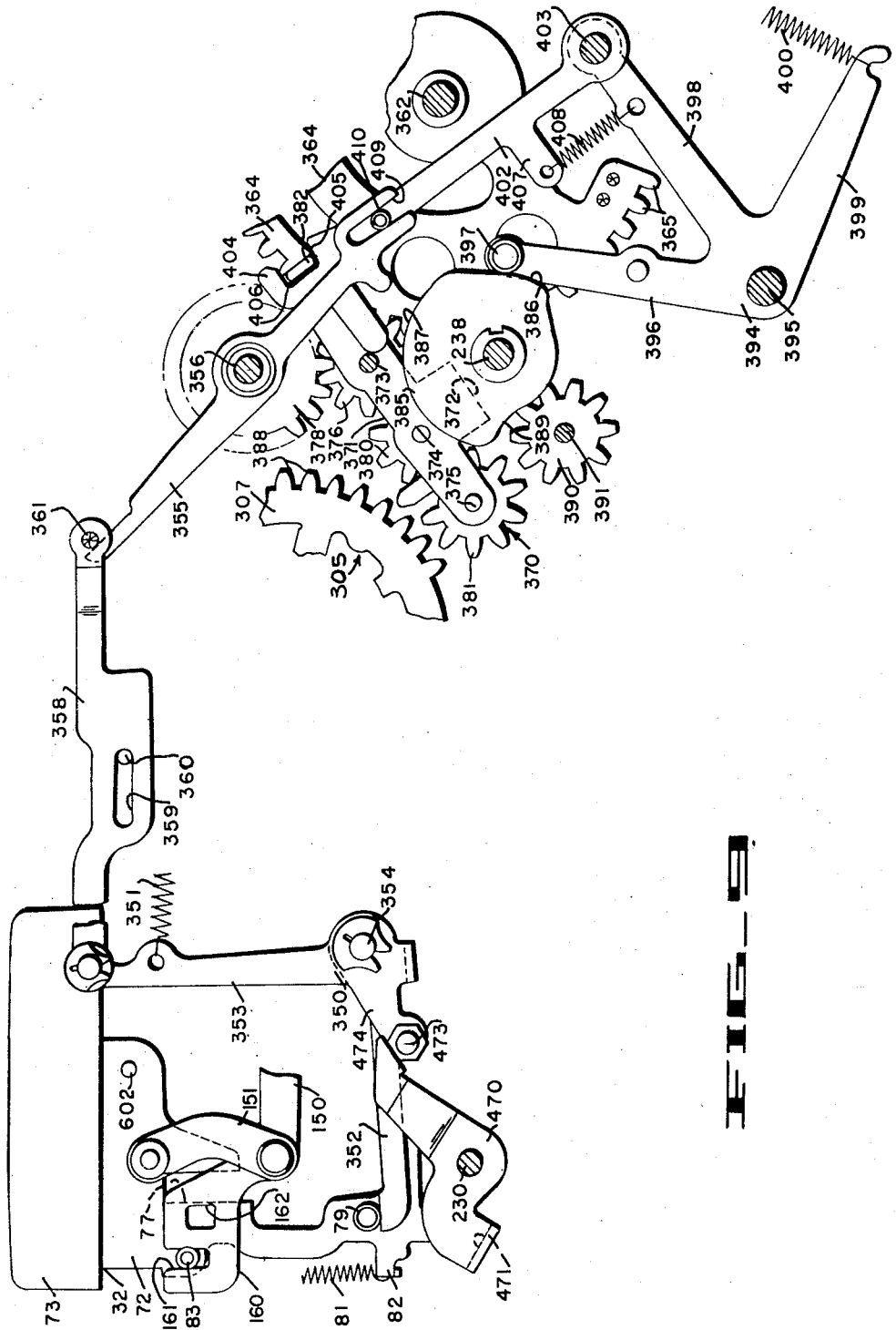

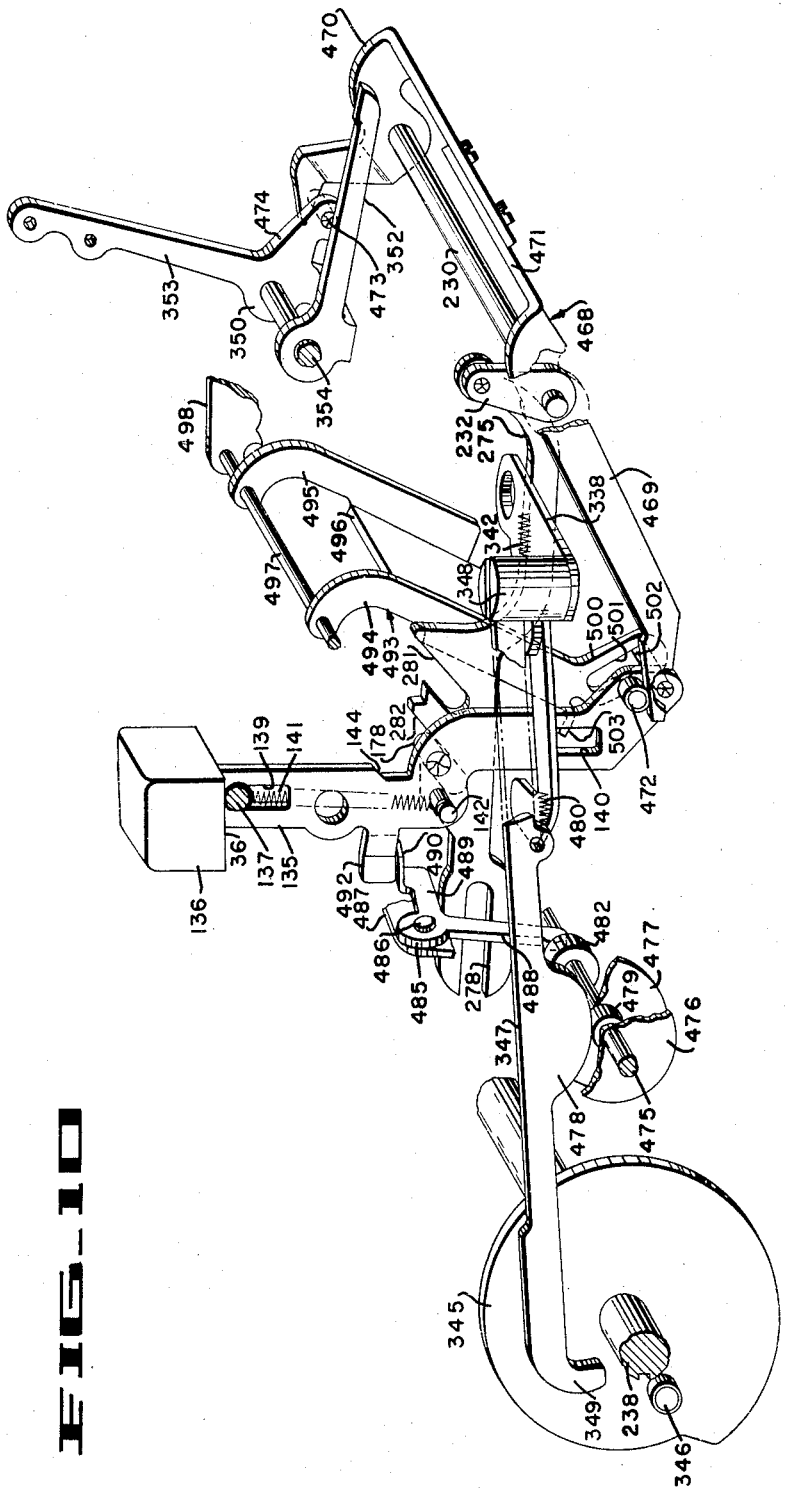

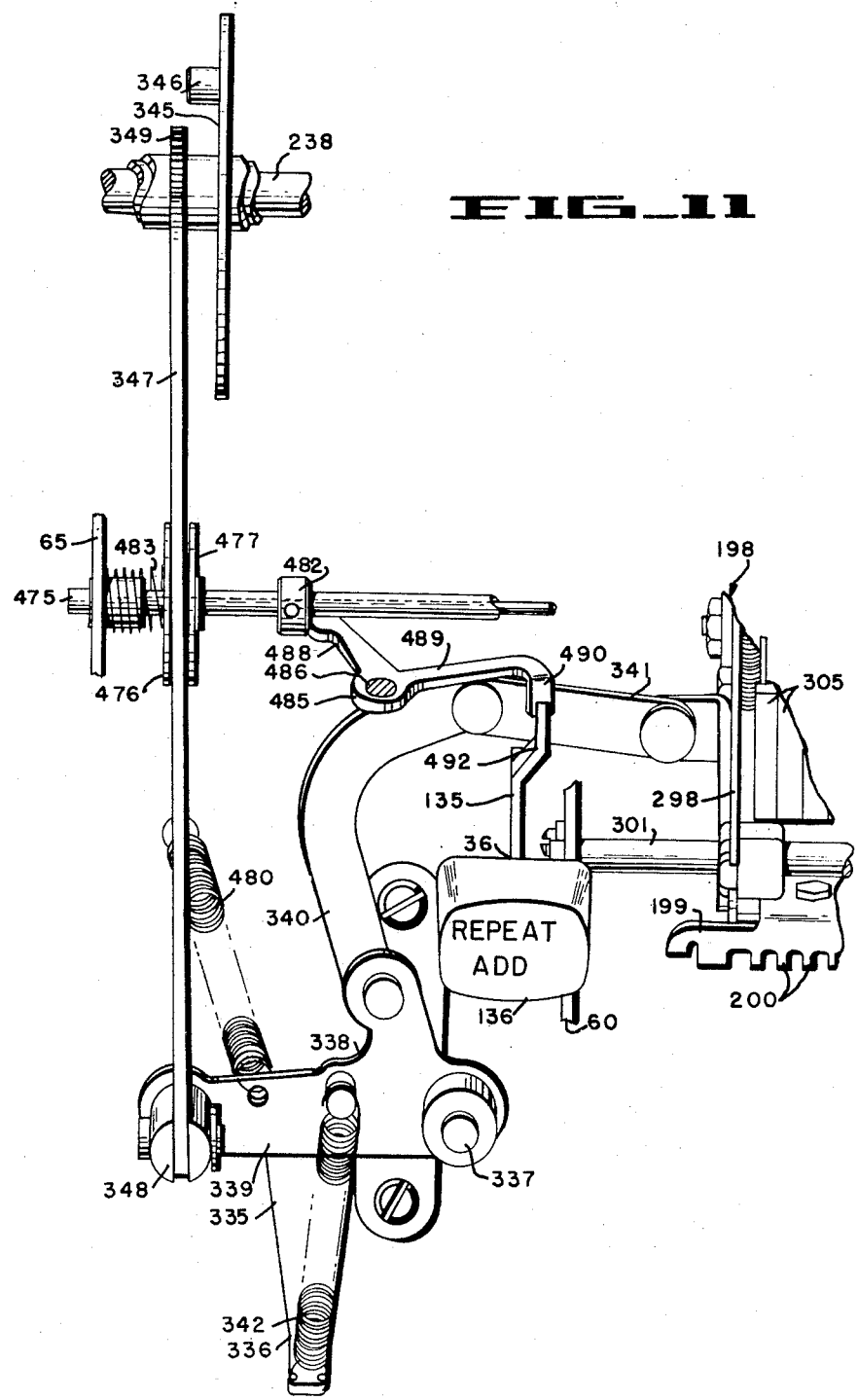

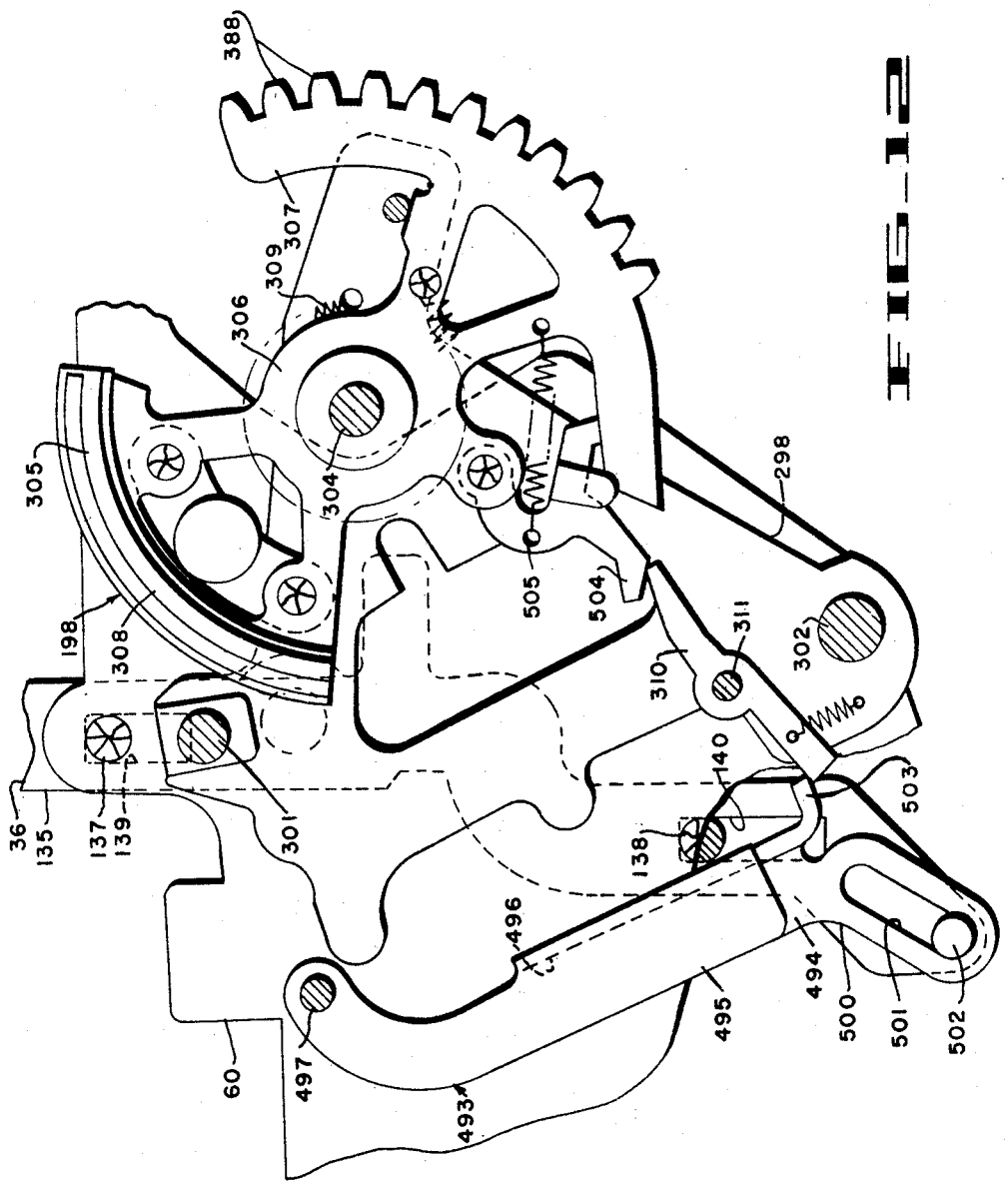

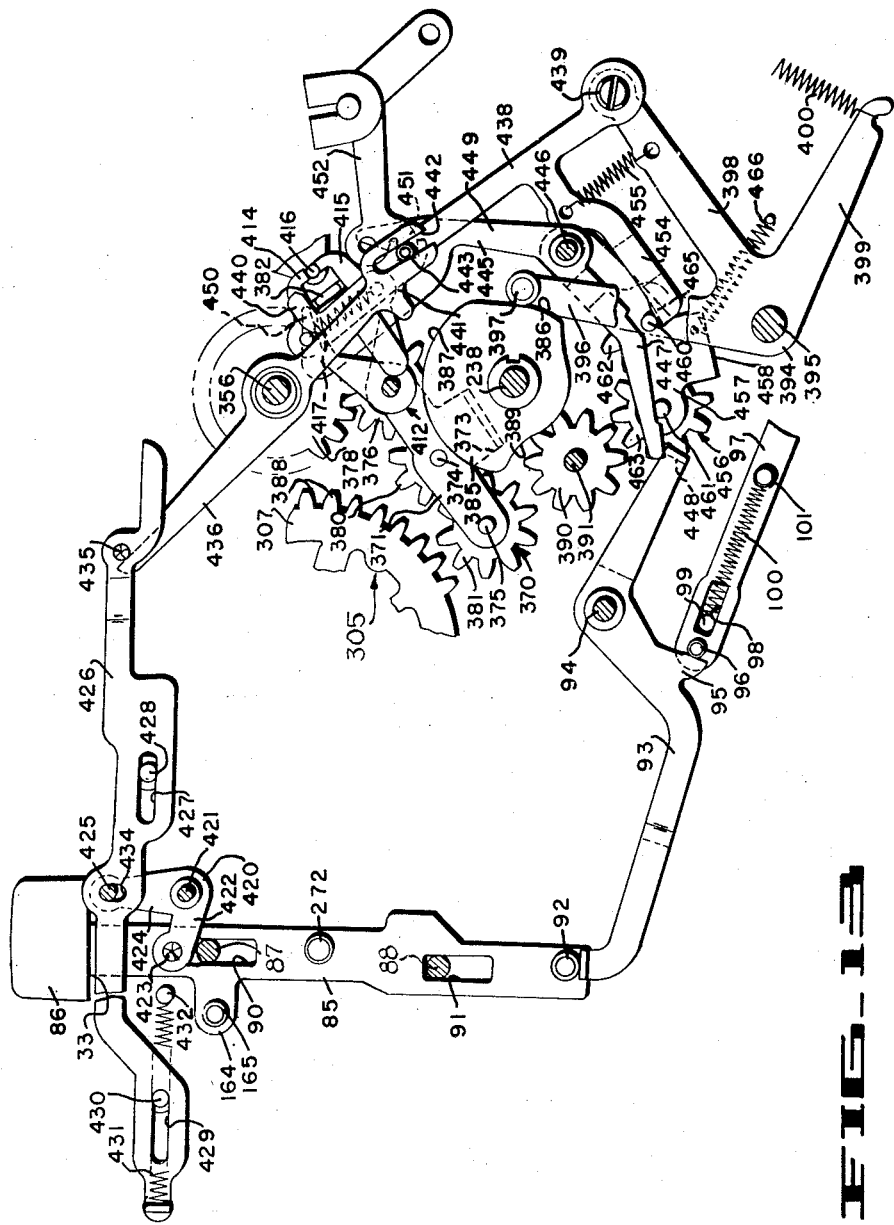

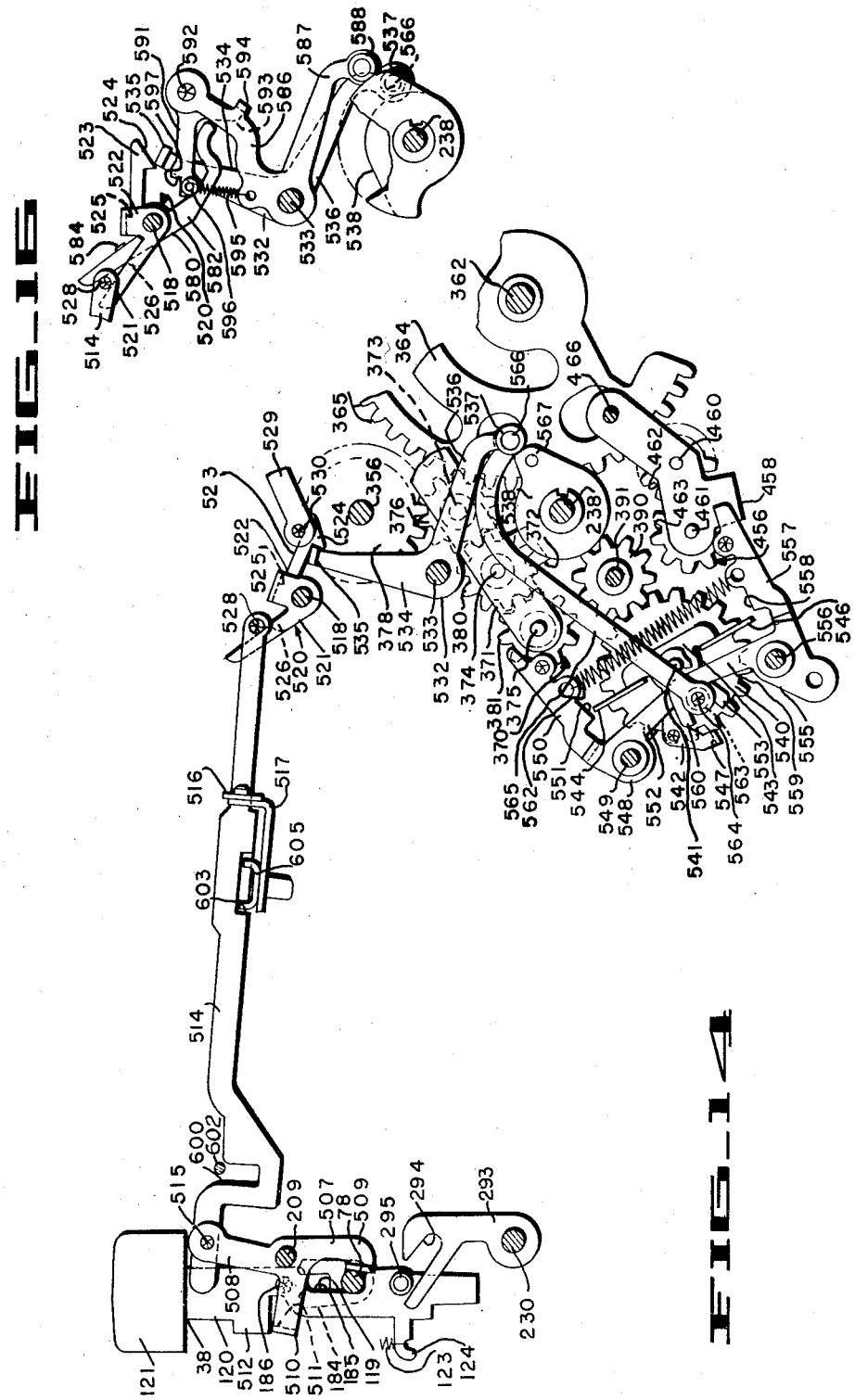

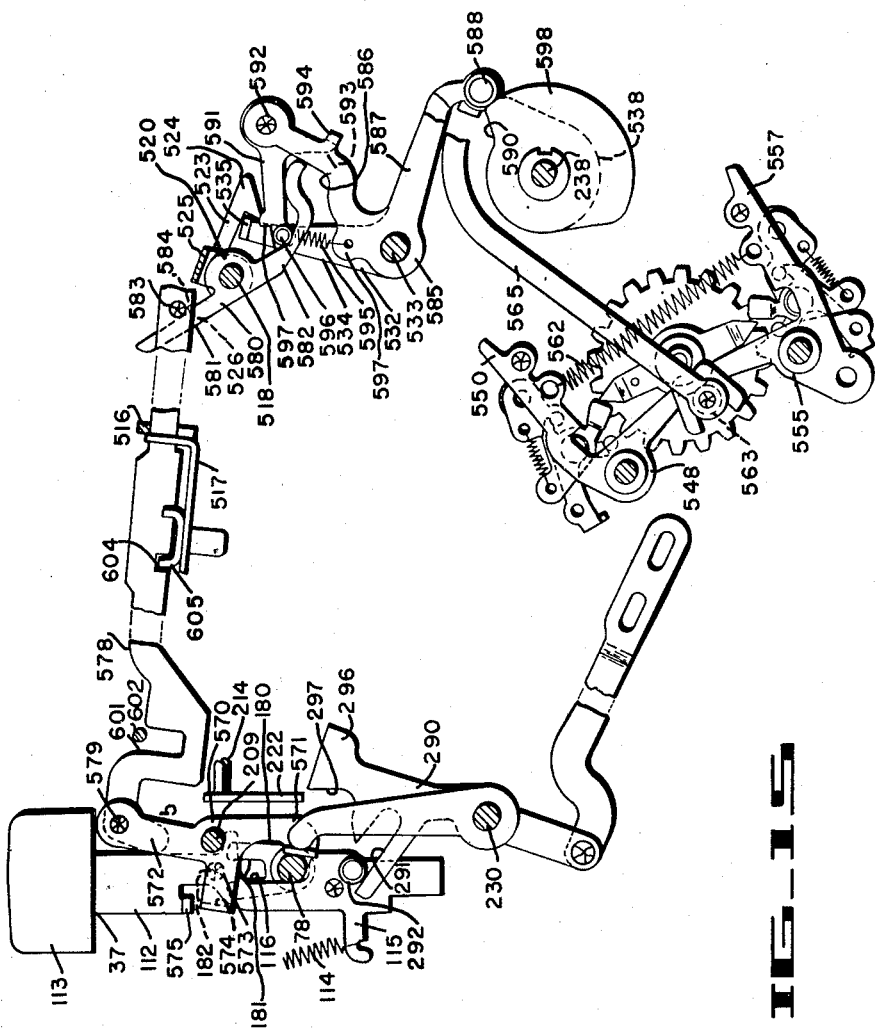

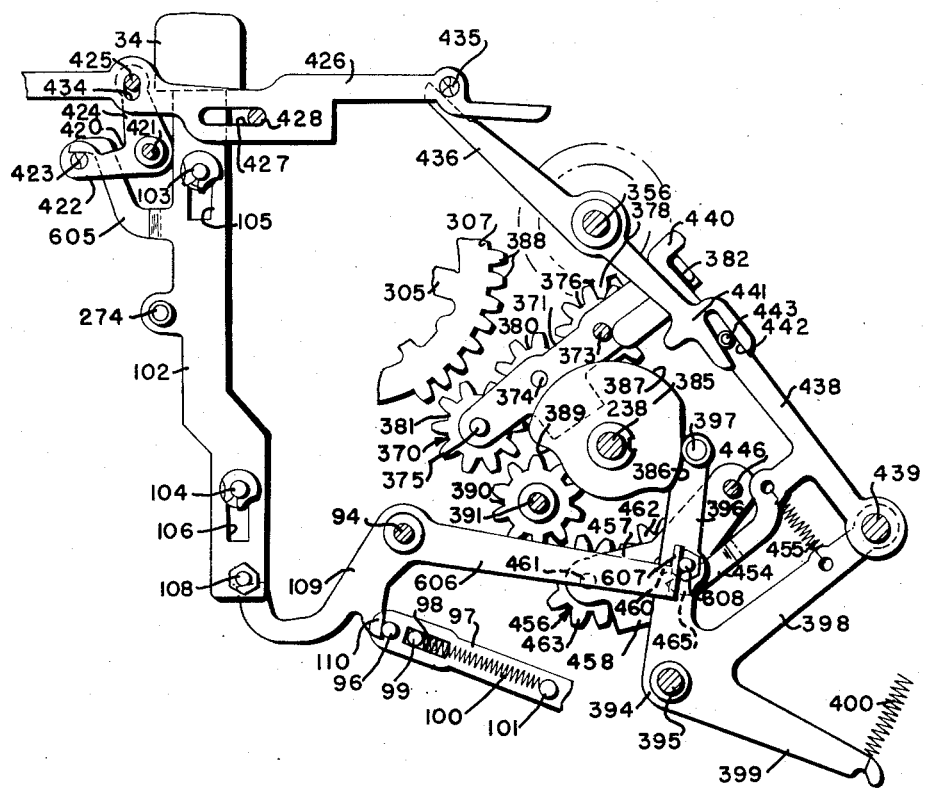
FIG_17

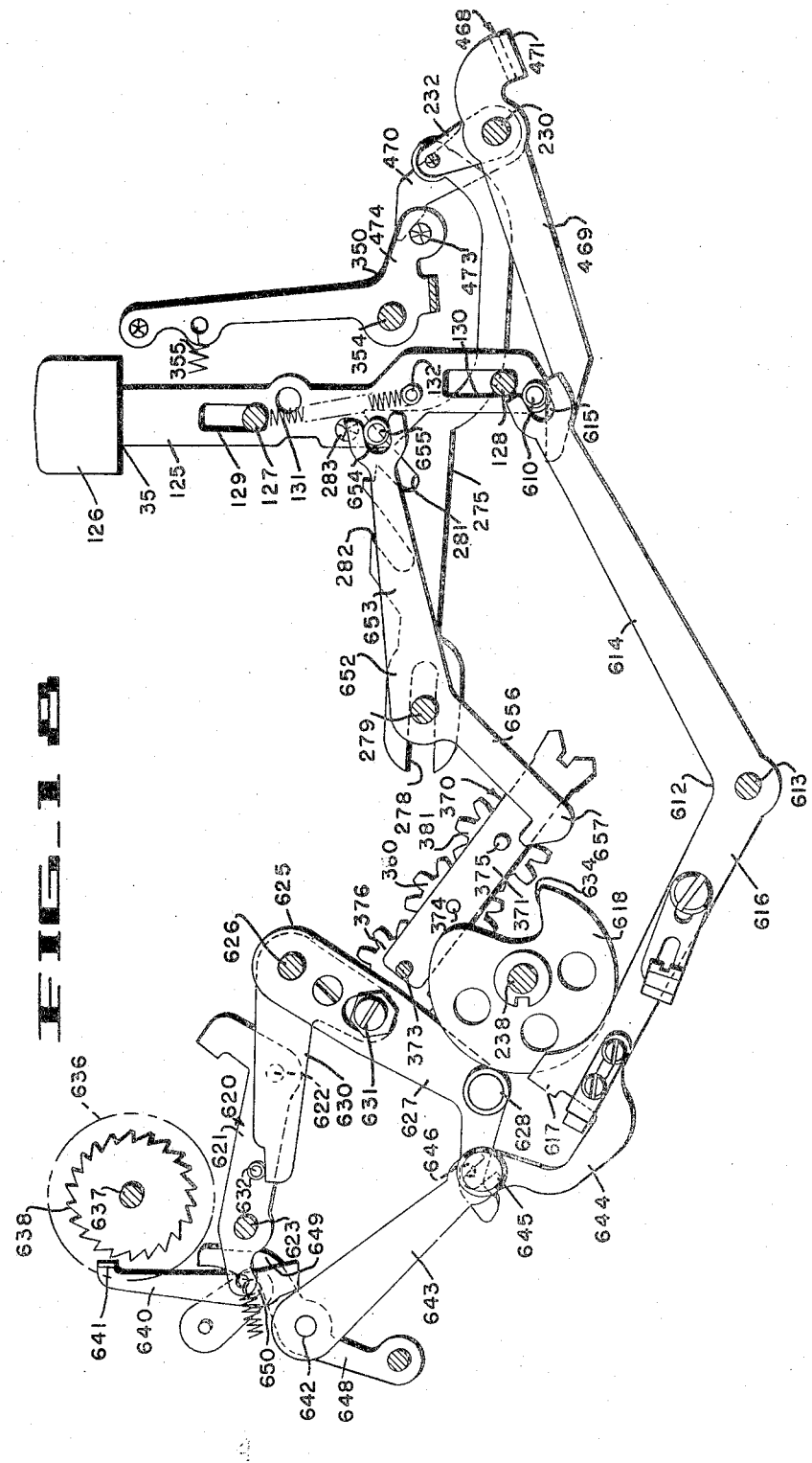

United States Patent Office 2,832,534
Patented Apr. 29, 1958

2,832,534

CONTROL MEANS FOR LISTING ADDING MACHINE

Harold J. Chall, San Leandro, and Arthur J. Malavazos, Oakland, Calif., assignors to Friden, Inc., a corporation of California Application June 28, 1954, Serial No. 439,552

15 Claims. (Cl. 235—60.27)

INDEX

| | Column |
|---|---|
| Selection mechanism | 14 |
| Addition control mechanism | 15 |
| Subtraction control mechanism | 18 |
| Repeat addition control cycle | 20 |
| Subtotal control mechanism | 22 |
| Total control cycle | 25 |
| Print only control cycle | 27 |
| Keyboard clearing cycle | 28 |

This invention relates to calculating machines, such as the ten-key adding machine disclosed in application S. N. 407,016, filed January 29, 1954, by Harold J. Chall, one of the coinventors herein, for "Listing Adding Machine Mechanism" and more particularly to the operating control and control interlock mechanism of such a machine and constitutes an improvement on the invention disclosed in said previously filed application S. N. 407,016.

It is among the objects of the invention to provide in a calculating machine, such as the ten-key, listing, adding machine shown in the Chall application referred to above, a control and control interlock mechanism by means of which the various operation cycles of the machine can be selectively established and the initiation of more than one operation at the same time automatically precluded; which conditions the machine mechanism and establishes the motor current for any selected machine operation and remains in effect until the selected operation is completed; which includes movably mounted control keys which are effective, when manually moved to operative position, to establish operations of additive and subtractive entry of selected values into the machine and printing of such values, repeated additive entry and printing of the same selected value, reading out and printing of total and subtotal values accumulated in the machine, printing of selected numbers without the entry of such numbers into the value accumulating mechanism of the machine, and automatic clearing of the digitation mechanism of the machine; which includes interlocking means which preclude manually moving more than one control key to operative position at the same time; which utilizes the same elements for machine controlling and control key interlocking purposes; which provides interlocking means between the digitation keys and control keys of the machine so that a digitation key and a control key cannot both be moved to operative position at the same time; which operates freely and positively to establish the selected operating cycles of the machine; and which effects the completion of any selected operating cycle in a single rotation of the main drive shaft of the machine.

Other objects and advantages will become apparent from a consideration of the following description and the appended claims in conjunction with the accompanying drawings wherein:

Fig. 2 is a perspective view of the mechanism supporting framework of the machine;

Fig. 3 is a perspective view of the control keys of the machine with the power actuated, machine cycling mechanism diagrammatically illustrated;

Fig. 4 is a fragmentary top plan view of the front portion of the machine showing features of the digitation mechanism and control mechanism of the machine;

Fig. 5 is an elevational view from the right-hand side of the machine showing a resiliently centered blocking element for the control keys at the right-hand side of the machine keyboard, parts of the machine frame being broken away and shown in cross section and other parts of the machine being omitted in this figure for the purpose of simplifying the drawing;

Fig. 6 is an elevational view from the left-hand side of the machine showing a blocking element for blocking the control keys at the left-hand side of the machine keyboard, parts of the machine being omitted for the purpose of simplifying the drawing;

Fig. 7 is a fragmentary cross-section view on an enlarged scale, taken substantially on the plane indicated by the line 7—7 on Fig. 4;

Fig. 8 is a somewhat diagrammatic perspective view of a portion of the digitation mechanism of the machine showing the interlock between the digitation mechanism and the control mechanism;

Fig. 9 is a somewhat diagrammatic elevational view from the right-hand side of the machine showing the control mechanism for printing entry values and additively entering such values into the accumulator mechanism of the machine;

Fig. 10 is a diagrammatic perspective view taken from the left-hand side of the machine showing mechanism for repeatedly printing the same entry value and repeatedly entering such value additively into the accumulator mechanism of the machine;

Fig. 11 is a fragmentary, diagrammatic perspective view taken from the front end of the machine showing the mechanism controlled by the repeat addition control key of the machine to prevent clearing of the entry value from the machine until the repeat addition operation has been completed;

Fig. 12 is a side elevational view from the right-hand side of the machine showing additional mechanism to restrain the machine from clearing out the entry value during a repeat addition operation of the machine;

Fig. 13 is a somewhat diagrammatic elevational view from the right-hand side of the machine showing the mechanism for printing an entry value and subtractively entering such value into the accumulator mechanism of the machine;

Fig. 14 is a somewhat diagrammatic elevational view from the right-hand side of the machine showing the control mechanism for reading out subtotal values from the accumulator mechanism of the machine and printing such values;

Fig. 15 is a somewhat diagrammatic elevational view, also from the right-hand side of the machine, showing the mechanism for reading out and printing total values;

Fig. 16 is an elevational view of certain parts of the mechanism shown in Figs. 14 and 15 and particularly illustrating the difference in operation of the subtotal and total control mechanism;

Figure 1:
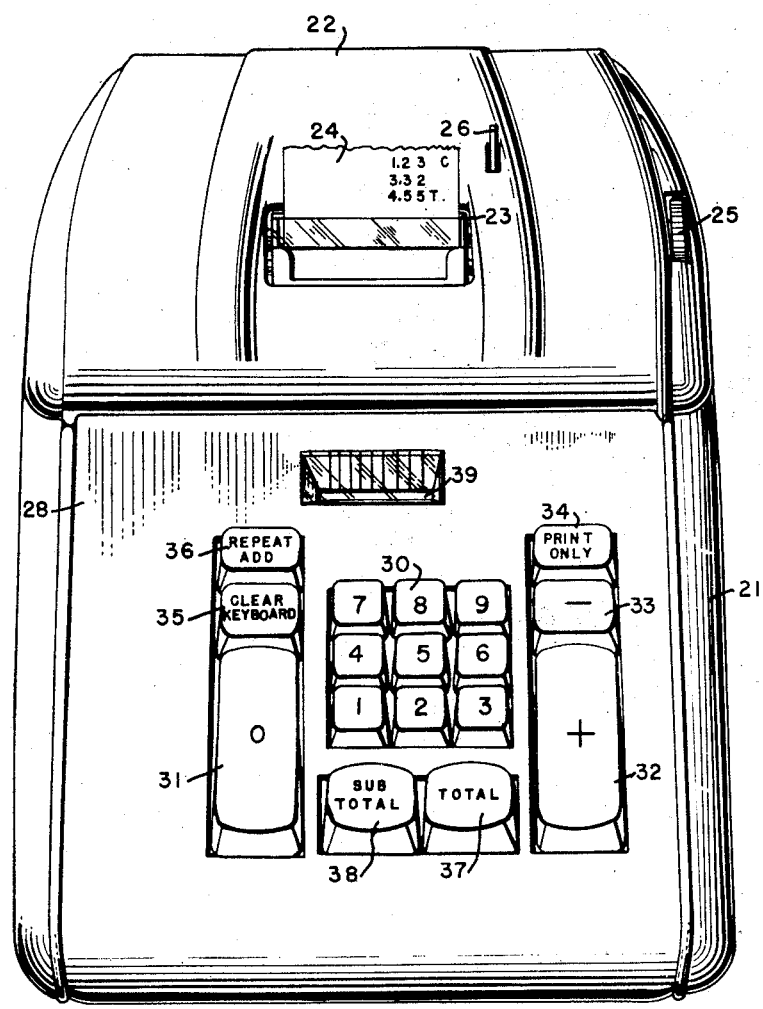
Fig. 1 is an external top plan view of a listing adding machine, such as that disclosed in the Chall application S. N. 407,016, referred to above, and to which the improved control mechanism of the present invention may be applied.

Fig. 17 is a somewhat diagrammatic elevational view taken from the right-hand side of the machine showing the mechanism for printing entry values without entering such values into the accumulator mechanism of the machine; and Fig. 18 is a somewhat diagrammatic elevational view taken from the left-hand side of the machine showing the mechanism for clearing an entry value from the digitation and selection mechanism of the machine without the printing of such value or the entry thereof into the accumulator mechanism of the machine.

With continued reference to the drawings, the machine, as illustrated in Figs. 1 and 2, has a flat base 20 on which the mechanism of the machine is mounted and this mechanism is enclosed in a cover 21 mounted at its open, bottom side on the base 20 and having a hinged cover 22. The top portion 22 is provided with a recess and transverse slot 23 through which the paper tape 24 on which the values are printed, projects. A manually operated, tape feeding wheel 25 and a manually set tape spacing control lever 26 also project through corresponding, longitudinally extending slots in the hinged cover 22. The front part 28 of the top portion of the cover is flat and inclined upwardly and rearwardly at an angle of approximately 30 degrees and is provided with openings through which the keyboard keys 30 project and with openings for the "0" key 31, the additive entry control key 32, the subtractive entry control key 33, the print only control key 34, the keyboard and selection mechanism clearing key 35, the repeat addition entry key 36, the total printing control key 37 and the subtotal printing control key 38.

Near the rear end thereof the front upper portion 28 of the cover is provided with a recessed, transversely extending slot 39 through which the selection mechanism dials are visible to the operator of the machine so that the operator can read the entry value before such value is entered into the machine by depressing any one of the control keys 32, 33, 34 or 36, and, if the dials show that the entry value is erroneous, can clear the erroneous value from the selection mechanism by depression of the clear key 35 before such erroneous value is printed or entered into the accumulating mechanism of the machine. This arrangement obviates the necessity of having to perform the additional step of subtracting an erroneous entry value from the total accumulated in the machine and subsequently adding in the correct entry value, since, with the present machine, the entry value can be erased before it is transferred from the selection mechanism.

It will be noted that the keyboard keys 30 are consecutively numbered from "1" to "9" and are arranged in a square pattern with three keys along each side of the square. The total and subtotal keys 37 and 38 are positioned directly in front of the group of keyboard keys 30 and are disposed in side-by-side relationship with the total key to the right and the subtotal key to the left. The top of the "0" key 31 is of elongated, rectangular shape, and is disposed to the left of the subtotal key and the two front rows of keyboard keys and the head of the addition control key 32 is of substantially the size and shape as the top or head of the "0" key and is disposed to the right of the total key and the two front rows of keyboard keys. The subtraction control key 33 is shorter than the addition control key and is disposed directly to the rear of the rear end of the top of the addition control key. The top of the print only control key is of the same size and shape as the top of the subtraction control key and is disposed directly to the rear of the top of the subtraction control key. The top of the clear key 35 is of substantially the same size and shape as the tops of the subtraction control key 33 and the print only control key 34. The clear key is disposed directly to the rear of the rear end of the top of the "0" key 31 and the repeat addition control key 36 has a top of substantially the same size and shape as the top of the clear key 35 and is disposed directly to the rear of the top of the clear key. With this arrangement, the control keys, together with the "0" key, are arranged in a U-shaped pattern which extends around the square pattern in which the keyboard or digit keys 30 are arranged.

Referring to Fig. 2, it will be observed that the flat base 20 is of elongated, rectangular shape and is provided with longitudinally extending grooves, as indicated at 40, in its upper surface, one such groove being spaced inwardly of and substantially parallel to each side edge of the base. A right-hand, rear frame plate 42 has spaced-apart feet 43 and 44, the bottom edges of which are disposed in the right-hand base groove 40 and secured to the base by suitable fasteners, not shown, of well-known form, so that the plate 42 is held in position in which it extends upwardly from the base substantially perpendicular thereto. An outboard plate or bracket 45 is spaced outwardly from and disposed substantially parallel to the plate 42 and is mounted on the plate 42 by suitable spacers, as indicated at 46, and screws, as indicated at 47, extending through spaced-apart apertures in the bracket 45 and through the corresponding spacer sleeves 46 and threaded into the plate 42 or into nuts disposed at the inner side of this plate. A front, right-hand, side plate 50 is disposed immediately in front of the rear plate 42 and has spaced-apart feet 51 and 52 the bottom edges of which are received in the forward portion of the right-hand base groove 40 which plate 50 is secured to the base by suitable fasteners so that it projects perpendicularly upward from the base. The top edges of the right-hand plates 42 and 50 are inclined rearwardly and upwardly at an angle of approximately 30 degrees to a location intermediate the length of the top edge of the rear plate 42 and the rear end of the upper portion of the plate 50 is secured to the front end of the upper portion of the plate 42 by a strut 53 the front end of which is formed to provide a guide comb 54 extending perpendicularly outwardly from the plate 50 and having upwardly opening notches in its upper end for a purpose to be later described.

A left-hand, rear frame plate 58 has spaced-apart feet, one of which is indicated at 59, the bottom edges of which are disposed in the left-hand groove of the base 20, which plate 58 is also secured to the base by fasteners of well-known form which hold this plate perpendicular to the base and in spaced and parallel relationship to the right-hand rear frame plate 42. The distance from the left-hand side edge of the base to the left-hand groove in which the bottom edge of the left-hand frame plate 58 is received is much greater than the distance from the right-hand edge of the base to the right-hand groove 40 so that the plate 58 is set inwardly from the left-hand edge of the base and constitutes the left-hand side plate of the printing and paper tape supporting mechanism of the machine. The left-hand, front frame plate 60 is also provided at its bottom edge with spaced-apart feet, the bottom edges of which are engaged in a longitudinally extending groove in the upper surface of the base 20, the plate 60 being set somewhat inwardly of the position of the left-hand rear frame plate 58 and the rear portion of the upper edge of the plate 60 is secured to the front portion of the upper edge of the plate 58 by a screw and spacer assembly 61. The distance between the front plates 50 and 60 is materially less than the width of the base 20 and is such as to conveniently receive the keyboard and selection mechanism of the machine.

A right-hand printing mechanism side plate 63 is disposed between the plate 58 and the plate 42 and has, at its bottom edge, spaced-apart foot formations, as indicated at 64, received in a groove provided in the upper surface of the base and this plate is also secured to the base by well-known fastening devices which hold it substantially perpendicular to the base and in spaced and parallel relationship to the plates 42 and 58. The distance between the plates 58 and 63 is such as to conveniently receive the printing mechanism and the paper tape roll therebetween and the printing mechanism and paper carrying mechanism are supported on these plates. A left-hand, outboard plate 65 is disposed adjacent the left-hand edge of the base and opposite the forward portion of the left-hand rear plate 58. At its bottom edge the plate 65 is mounted on an angle bracket 66 which is secured to the base by suitable means, such as screw fasteners, the plate 65 being secured in its spaced and parallel relationship to plate 58 by a suitable spacer 67 and screws, as indicated at 68 extended through apertures in the plates 58 and 65 and threaded into the corresponding ends of the spacer 67. A front frame plate 70 extends between the front ends of the front side plates 50 and 60 and is rigidly secured to these side plates to secure them in their spaced-apart and parallel relationship to each other, this front plate also providing a support for certain of the digitation and control mechanisms of the machine.

The base 20 and the upright plates 42, 50, 58, 60, 63 and 65 provide a rigid frame on which all of the components of the mechanism of the machine are mounted so that all of the movable parts of the machine are rigidly supported in proper, cooperative relationship to each other.

As shown in Figs. 3 and 9, addition control key 32 has an elongated, flat stem 72 disposed in upright position relative to the machine base 20 and carrying on its upper end the head or top block 73 of elongated, rectangular shape. The upper portion of the stem 72, below the head 73, is slidably received in a notch 74, Fig. 2, in a rearwardly directed flange 75 at the upper edge of the transverse front plate 70 of the machine and the lower portion of the stem 72 extends slidably through a slot in a rearwardly directed bottom flange 76 of the front plate. The upper end of the stem 72 is rearwardly extended and provided with a downwardly opening notch 77 which slidably receives a shaft 78 which extends transversely of the frame adjacent the inner side of the front plate 70 and near the front, upper corners of the front side plates 50 and 60 and is supported at its ends in these side plates. The key stem 72 is disposed at the inner side of the right-hand, front side plate 50 and a stud 79 projects perpendicularly to the right from the lower portion of this key stem and through an aperture 80 near the front lower corner of the plate 50 for a purpose to be later described. A tension spring 81 connected at its lower end to an extension 82 directed forwardly from the lower portion of the key stem 72 and connected at its upper end to the upper portion of the transverse front plate 70, resiliently urges the key 32 to its upper limiting position in which a pin 83 projecting to the right from the front upper portion of the stem 72 engages the top end of an opening 84 in the plate 50 through which opening the pin 83 projects. With this arrangement, the addition key is firmly supported on the machine frame for up-and-down movements and is resiliently urged to its upper limiting position by the tension spring 81.

As shown in Figs. 3 and 13, substraction key 33 has an elongated flat stem 85 carrying on its upper end the rectangular-shaped head or top block 86. The stem 85 is disposed at the outer side of the right-hand, front frame plate 50 and is secured to the plate by the pins 87 and 88 projecting outwardly from the plate, one near the upper and one near the lower edge of the plate, and extending through longitudinally extending slots 90 and 91 spaced apart longitudinally of the key stem 85. A stud 92 projecting to the right from the lower end portion of the stem 85 rides on the front end of a lever 93 pivotally mounted intermediate its length on a shaft 94 extending transversely between the frame plates 50 and 60. This lever 93 is provided below and somewhat forwardly of the shaft 94 with a rearwardly directed shoulder 95 which bears against a stud 96 projecting to the right from the forward end of a link 97. The link 97 is provided near its forward end with a longitudinally extending slot 98 receiving a fixed stud 99 and a spring 100 connected between the stud 99 and a stud 101 projecting to the right from the link 97 at a location spaced rearwardly from the stud 99 resiliently urges the key 33 to its upper limiting position in which the pins 87 and 88 abut the lower ends of the corresponding slots 90 and 91 in the key stem 85. The link 97 is a component of symbol printing mechanism completely illustrated and described in application S. N. 407,016, referred to above, and application S. N. 422,571 filed April 12, 1954, by Harold J. Chall for "Symbol Printing Mechanism."

As shown in Figs. 3 and 17, the print only key 34, shown in depressed position in Fig. 17, has a flat stem 102 disposed at the outer side of the frame plate 50 in upright position and mounted on the frame plate by pins 103 and 104 projecting outwardly from the plate 50 at locations spaced apart in a direction away from the base 20 and extending through corresponding slots 105 and 106 in the key stem, which slots extend longitudinally of the key stem and are spaced apart longitudinally thereof.

A stud 108 projects to the right from the lower end portion of the print only key stem 102 and rides on the front end of a lever 109 pivoted intermediate its length on the shaft 94 and provided below and somewhat forwardly of the shaft with a rearwardly directed shoulder 110. The shoulder 110 bears against the stud 96 carried at the front end of the link 97 and a spring 100 acts to resiliently urge the key 34 to its upper limiting position in which the pins 103 and 104 are at the bottom ends of the corresponding slots 105 and 106 in the key stem.

The subtract key stem 85 is provided near its lower end with a projection extending from its rear edge and provided with a downwardly and forwardly inclined cam surface 111. The print only key stem 102 is provided at its front edge and near its lower end with a downwardly and rearwardly inclined cam surface 712. A gate 713, Fig. 3, pivotally mounted at its lower end, below the key stems 85 and 102 on a pivot pin 714, is disposed between the key stems 85 and 102 and has an upper end portion of increased width carrying perpendicularly disposed studs 715 and 716 which are engageable with the cam surfaces 111 and 712 and are spaced apart a distance such that either one of the key stems 85 or 102 can be moved downwardly so that the corresponding cam surface passes the adjacent pin but both of these key stems cannot be moved downwardly simultaneously.

As shown in Figs. 3 and 15, total printing control key 37 has a flat stem 112 carrying on its upper end the rectangularly-shaped head or top block 113 and the upper portion of this key stem is slidably received in the notch 114 in the top flange 75 of the front frame plate 70. The lower end of the key stem 112 is slidably received in a slot in the bottom flange 76 of the plate 70 to support the key stem in upright position for up-and-down movement and the key stem is provided in its rear edge with a recess receiving the shaft 78. A spring 114 connected at its lower end to an extension 115 projecting forwardly from the front edge of the lower portion of the key stem 12 and connected at its upper end to the upper portion of the front transverse plate 70 resiliently urges the key 37 to its upper limiting position in which the bottom of the recess 116 for the shaft 78 engages the lower surface of this shaft.

The subtotal key 38, as shown in Figs. 3 and 14, also has a flat stem 120 carrying at its upper end the rectangularly-shaped top block or head 121. The upper portion of the key stem 120 is slidably received in the notch 122 in the top flange 75 of the transverse front plate 70 while the lower portion of this key stem is slidably received in a corresponding slot in the bottom flange 76 of the plate 70. This key stem has in its rear edge an elongated recess 119 receiving the shaft 78 and a spring 123 connected at its lower end to an extension 124 projecting forwardly from the forward edge of the lower portion of the key stem 120 and connected at its upper end to the upper portion of the frame plate 70 resiliently urges the key 38 to its upper limiting position in which the bottom end of the recess 119 engages the bottom surface of the shaft 78.

The keyboard clear key 35, as shown in Figs. 3 and 18, has a flat, elongated stem 125 disposed at the outer side of the front frame plate 60 and carrying on its upper end the rectangularly-shaped top block or head 126. This key is mounted in upright position on the plate 60 for up-and-down movement by vertically spaced-apart pins 127 and 128 projecting outwardly from the plate 60 and through corresponding slots 129 and 130 provided in the key stem 125 at locations spaced apart longitudinally of the key stem. The key 35 is resiliently urged to its upper limiting position in which the pins 127 and 128 are in the bottoms of the corresponding slots 129 and 130, by a spring 131 connected at its upper end to the upper guide pin 127 and connected at its lower end to a pin or stud 132 which projects to the left from the key stem 125 near the upper end of the lower slot 130 in the key stem.

The repeat add key 36, as shown in Figs. 3 and 10, has a flat stem 135 disposed at the outer side of the frame plate 60 and carrying on its upper end the rectangularly-shaped head or top block 136. The key stem 135 is mounted in upright position at the outer side of the plate 60 for up-and-down movements by pins 137 and 138 extending to the left from the frame plate at vertically spaced-apart locations and through slots 139 and 140 extending longitudinally of the key stem at locations spaced apart longitudinally of the stem. The key 36 is resiliently urged to its upper limiting position, in which the pins 137 and 138 are at the bottoms of the corresponding key stem slots 139 and 140, by a tension spring 141 connected at its upper end to the upper pin 137 and connected at its lower end to a stud 142 carried by the key stem 135 below the slot 139.

The clear key stem 125, Fig. 18, is provided intermediate the length of its rear edge with a downwardly and forwardly inclined cam surface 143, and the key stem 135 is provided in its front edge with an opposed, downwardly and rearwardly inclined cam surface 144. A blocking gate 145, Fig. 3, pivotally mounted at its lower end on the plate 60, is disposed between the key stems 125 and 135 and carries at its upper end pins 146 and 147 respectively engageable with the cam surfaces 143 and 144, the distance between these pins being such that either one of the keys 35 or 36 can be manually depressed but both of these keys cannot be manually depressed simultaneously.

Referring now to Figs. 5 and 6, a blocking bar 150 extends along the outer sides of the key stems 85 and 102 below and substantially parallel to the upwardly and rearwardly inclined top edge of the right-hand, front frame plate 50 and is supported from this frame plate by links 151 and 152 pivotally mounted at their upper ends on and depending from studs 153 and 154, respectively, which studs project to the right from the plate 50 at locations spaced apart longitudinally of the upper edge of the plate. The link 152 is pivotally connected at its lower end to the rear end of the bar 150 and the link 151 is pivotally connected at its lower end to the bar 150 near the front end of the bar. A resilient centering device 155 is mounted on the outer side of the plate 50 and engages a stud 156 on the bar 150 to resiliently urge the bar to a centered position relative to the plate. The bar is guided, intermediate its length, by a guide bracket 157 disposed against the outer side of the plate 50 and rigidly secured to this plate. The bar is provided with upwardly extending projections 158 and 159, each having a flat top surface and a downwardly and rearwardly inclined upper rear corner, and is provided at its front end with an upwardly offset portion 160 of increased width having therein an upwardly opening notch 161 and an aperture 162 disposed rearwardly of the notch 161, the portions of the upper edge of the end portion 160 of the bar at opposite sides of the notch 161 being flat.

Extension 159 is located near the rear end of the bar 150 and a stud 163 projecting to the right from the print only key stem 102 just below the bottom end of the upper slot 105 in this key stem is engageable with the upper end of the extension 159, this stud 163 engaging the inclined upper rear corner of the extension 159 when the bar 150 is in its centered position, to move the bar forwardly when the print only key is depressed. An extension 164 projects forwardly from the forward edge of the stem 85 of the subtraction key 33 at the location of the upper slot 90 in this key stem and carries a stud 165 spaced forwardly from the slot 90 and projecting to the right from the key stem, which stud engages the upper end of the extension 158 of the bar 150 and moves the bar forward when the subtraction key 33 is depressed with the bar 150 in its centered position. The stud 83 projecting to the right from the upper portion of the stem 72 of the addition key 32 is disposed above the open upper end of the notch 161 in the front end portion 160 of the bar 150 and, when this bar is moved forwardly, the stud 83 engages the top edge of the front portion 160 of the bar rearwardly of the notch 161 and blocks the addition key against depression.

With the above-described ararngement, when either the subtraction key or the print only key is depressed, the addition key is blocked and, since the blocking gate 113 precludes simultaneous depression of the subtraction and print only keys, only one of the control keys at the right-hand side of the keyboard can be depressed at one time.

An arm 166 is mounted at its lower end on the right-hand end of the shaft 78 and carries at its upper end an outwardly projecting stud 167 which is received in the aperture 162 in the front end portion of the bar 150 so that the shaft 78 is rocked whenever the bar 150 is moved longitudinally and, conversely, the bar 150 is moved longitudinally whenever the shaft 78 is rocked.

As shown in Fig. 6, arm 169 is mounted at its upper end on the left-hand end of shaft 78 and depends from this shaft at the outer side of the front, left-hand frame plate 60, and a blocking bar 170 is pivotally connected at its forward end to the bottom end of the arm 169 and extends rearwardly from the arm 169 between the frame plate 60 and the stems 125 and 135 of the keyboard clear key 35 and the repeat addition key 36. At its forward end the bar 170 is provided with a longitudinally extending notch 171 which receives an elongated stud 172 which projects to the left from the plate 60 near the rear end of this plate. The blocking bar 170 has upwardly projecting extensions 175 and 176 at locations spaced apart therealong and respectively disposed at the inner side of the keyboard clear key stem 125 and the repeat addition key stem 135. These extensions have flat top edges and downwardly and rearwardly inclined upper rear corners and the key stem 125 has a stud 177 projecting to the right therefrom and engaging the extension 175 while the key stem 135 has a corresponding stud 178 projecting to the right therefrom and engaging the extension 176.

The blocking bar 170 is also resiliently centralized by the centering device 155 and, when the bar 170 is centered, the studs 177 and 178 are disposed in opposition to the beveled corners of the corresponding extensions 175 and 176 so that downward movement of either of the keys 35 or 36 will move the bar 170 forwardly. The blocking gate 145 precludes simultaneous depression of the keys 35 and 36 and depression of either one of these keys will move the bar 170 forwardly and the right-hand blocking bar 150 rearwardly to block all of the control keys at the right-hand side of the keyboard.

As best shown in Figs. 8 and 15, total key blocking arm 180 is mounted on the shaft 78 adjacent one side of the total key stem 120 and extends upwardly from the shaft 78 having in its upper portion an upwardly opening notch 181. A stud 182 secured to and extending perpendicularly from the total key stem 120 at the upper end of the arm 180 is receivable in the notch 181 to permit the total key to be depressed when the blocking bars 150 and 170 are in their centered position. However, when these blocking bars have been moved, by depression of one of the other control keys, away from their centered position, the stud 182 will strike the upper end of the arm 180 and the total key cannot be depressed. A similar arm 184 extends upwardly from the shaft 78 at one side of the sub-total key stem 120 and this arm 184 is provided in its upper portion with an upwardly opening notch 185. As shown in Fig. 14, stud 186 projects from the subtotal key stem 120 at the upper end of the arm 184 and this stud is receivable in the notch 185 when the blocking bars 150 and 170 are centered, to permit depression of the subtotal key. However, when the bars 150 and 170 are moved away from their centered position by depression of any control key other than the total control key, the stud 186 will strike the upper end of the arm 184 and the subtotal key cannot be depressed. There is no block to prevent simultaneous depression of the total and subtotal keys since the result of such a simultaneous depression will be to give a total printing rather than a subtotal printing and this will not in any way interfere with the operation of the machine or endanger the mechanism.

With the above-described blocking arrangement only one control key can be depressed at one time with the exception of the total and subtotal keys, as explained above.

Referring now to Figs. 3 and 8, the "0" key 31 has a flat stem 190 disposed in upright position adjacent the outer side of the front, left-hand frame plate 60 and carrying on its upper end the rectangularly-shaped head or top block 191. The "0" key stem 190 is supported in upright position adjacent the outer side of the frame plate 60 for up-and-down movement by studs 192 and 193 extending to the left from the plate 60 at vertically spaced-apart locations and received in corresponding slots 194 and 195 provided in the key stem 190 at locations spaced apart longitudinally of the key stem. The key is resiliently urged to its upper limiting position in which the studs 192 and 193 are in the bottom ends of the corresponding slots 194 and 195 by a spring 196 connected at its lower end to a stud 197 projecting from the key stem adjacent the upper end of the lowest slot 195, and connected at its upper end to the stud 192.

The machine has selection mechanism, generally indicated at 198 in Fig. 7 and to be later described in detail, which is shiftable to the left from its right-hand, home position in a step-by-step manner as the numeral keys 30 and "0" key 31 are successively depressed and this mechanism includes a detenting comb 199 provided with forwardly directed, spaced-apart detent teeth 200. The digitation mechanism of the machine includes detenting mechanism, generally indicated at 201, and including a locking pawl 202 pivotally mounted at one end on a pivot pin 203 at the left-hand side of the keyboard and having at its right-hand end an upwardly extending detent formation 204 which engages between the comb teeth 200, and a holding pawl 205 pivotally mounted at its right-hand end on a pivot pin 206 disposed adjacent the right-hand side of the keyboard and carrying at its left-hand end a detent formation 207 which is normally disposed above the comb 199 but is movable into interdental spaces of the comb when the pawl 205 is rocked downwardly. The locking pawl 202 and the holding pawl 205 are resiliently urged to their upper position by a spring 208 connected between tongues extending downwardly from the pins 203 and 206 and formed integrally with the pawls 202 and 205, respectively. The arrangement is such that when the overlapping ends of the pawls 202 and 205 are formed downwardly and then released, the comb 199 and the associated selection mechanism will be stepped one space to the left and relatched in its new position, as is more fully explained in application S. N. 407,016, referred to above.

A notched arm 210 is mounted on the left-hand end of a shaft 209 and extends rearwardly from this shaft and a stud 211 extending to the right from the "0" key stem 190 is engaged in the notch in the arm 210 to rock the shaft 209 in a clockwise direction as viewed from the right-hand side of the machine whenever the "0" key is depressed. A shaft 214 is journalled in the keyboard frame and extends between and substantially parallel to the front frame plates 50 and 60 and this shaft carries on its rearward end an arm 215 carrying a stud 216 which engages in a recess in the right-hand end portion of the holding pawl 205 to force the right-hand end of this pawl downwardly when the shaft 214 is rocked to the left, as viewed in Fig. 8. The pawl 205 has on its left-hand end a detent formation 217 which rides on a stud 218 projecting forwardly from the right-hand end of the locking pawl 202 so that the adjacent ends of both pawls are forced downwardly when the shaft 214 is rocked. An arm 220 is mounted on the forward end of the shaft 214 and extends to the left from the shaft and an arm 221 is mounted on shaft 209 adjacent the forward end of shaft 214 and rides on the upper edge of arm 220 to rock the shaft 214 to the left when the shaft 209 is rocked clockwise by depression of the "0" key 31 to thereby step the selection mechanism one space to the left each time the "0" key is depressed. The arm 220 has a downwardly directed extension 222 the lower end of which swings to the right whenever the shaft 214 is rocked, as indicated above, and this extension or tongue 222 cooperates with the cycle-establishing mechanism of the control keys in a manner to block depression of any of the control keys when the "0" key is depressed and, conversely, to block depression of the "0" key when any one of the control keys is depressed.

Each of the digit keys 30, Figs. 4 and 7, has a flat stem 224 guided for up-and-down movements in registering apertures in the upper and lower sides of the keyboard frame. Each of these key stems has a lower end portion 225 projecting through the lower side of the keyboard frame to operate the stop pin setting mechanism of the digitation mechanism of the machine in a well-known manner, and has intermediate its length a laterally offset shoulder formation 226, the lower edge of which rides on an escapement bar 227. The escapement bar is supported at its ends by arms pivotally secured one to the front end and the other to the rear end of the keyboard frame and this bar extends through the recess in the left-hand end of the pawl 205, Fig. 8, and is effective to force the adjacent ends of the pawls 205 and 202 downwardly to operate the escapement mechanism and step the selection mechanism one space to the left each time a digit key is depressed. The front end portion of the bar 227 rides on the upper end of the downwardly directed extension 222 of the arm 220 so that the lower end of the extension 220 will be swung to the right each time a digit key is depressed as well as when the "0" key 31 is depressed, thereby providing the effect that no one of the control keys can be depressed while a digit key is depressed and, conversely, no digit key can be depressed while any one of the control keys is depressed.

As shown in Figs. 3 and 8, shaft 230 extends between and is journalled in the front frame side plates 50 and 60 near the base 20 and below and parallel to the shaft 78. An arm 231 is secured on the right-hand end of the shaft 230 and projects upwardly therefrom and a similar arm 232 is secured on the left-hand end of this shaft and projects upwardly from the shaft. A clutch actuating bar 234 is pivotally connected at its forward end to the upper end of the arm 231 and extends rearwardly from the arm 231 past the outer sides of the key stems 85 and 102. This bar 234 is connected at its rearward end to a clutch control dog 235 by a pivotal connection 233 for releasing the cycle-establishing clutch of the machine.

The cycle-controlling clutch, generally indicated at 236, comprises a ratchet wheel 237 mounted on and drivingly connected to the cam shaft 238 of the machine, a gear 239 journalled on the cam shaft and carrying a clutch disk 240, a clutch pawl 241 pivotally mounted at one end on the disk 240, as indicated at 242, and having a tooth 243 for engaging the teeth of the ratchet wheel 237, and a spring 244 connected between the disk 240 and the free end of the pawl 241 resiliently urging the pawl into engagement with the ratchet wheel. The clutch operating dog 235 is pivotally mounted at its lower end on a pivot pin 245 and upstands from this pin past the front end of the clutch pawl 241. The pawl 241 is provided in its free front end with a transverse shoulder 248 with which a complementary shoulder formation on the dog 235 engages when the dog is released to hold the clutch pawl out of engagement with the clutch ratchet 237, as shown in Fig. 3. When the actuating bar 234 is moved forwardly, as will be presently explained, the shoulder formation on the dog 235 is moved out of engagement with the pawl shoulder 248 thereby releasing the spring 244 to move the pawl tooth 243 into engagement with the teeth of the ratchet 237. The gear 239 will then be drivingly connected to the cam shaft 238 and will drive the cam shaft through one complete rotation until the shoulder 248 again contacts the lower end of the dog 235 and the dog forces the pawl tooth out of engagement with the ratchet 237. The disk 240 has a single dwell therein adjacent the free end of the pawl 241 and a roller 249 mounted on the dog 235 adjacent the shoulder formation thereon, rides on the periphery of the disk 240 and maintains the dog out of engagement with the pawl until a single rotation of the cam shaft has been completed.

The machine is provided with a suitable power unit, such as an electric motor having a shaft 251 carrying a small drive gear 252. A first idler gear 253 is mounted on an arbor 254 extending between the right-hand rear frame plate 42 and the right-hand outboard plate or bracket 45 and meshes with the motor gear 252. A second idler gear 255 is mounted on an arbor 256 extending between the plate 42 and outboard plate 45 at a location spaced from the arbor 254 and a gear 257 journalled on the arbor 254 and secured to the gear 253 meshes with and drives the gear 255. A small reversing gear 258 journalled on an arbor 259 also extending between the plates 42 and 45, meshes with the gears 255 and 239 to provide a reverse driving connection between these gears.

With this arrangement the gear 239 will be driven at a reduced speed from the motor shaft 251 and will impart successive rotational cycles to the cam shaft 238 under the control of the one rotation or single cycle clutch 236.

An extension 260 of the bar 234 is pivotally connected at its front end to the upper end of the clutch dog 235 by a pivotal connection 250 and has its rear end in engagement with the operating arm 261 of a motor controlling switch 262 to energize the machine motor whenever the clutch dog 235 is released from the clutch pawl 241.

The clutch actuating bar 234 is provided in the portion thereof overlying key stems 85 and 102, with a portion 265 of increased width having therein upwardly opening and upwardly and forwardly inclined notches 266 and 267 spaced apart longitudinally of the bar. The rearward edge of the notch 266 is rearwardly offset to provide an upwardly facing shoulder 268 and an extension 269 at the rearward side of the notch 267 has a flat top surface providing a shoulder 270.

The key stem 85 carries a stud mounted roller 272 projecting to the right therefrom and engageable in the notch 266 and the key stem 102 carries on a forwardly directed offset 273 thereof a stud mounted roller 274 engageable in the notch 267.

By reason of the upwardly and forwardly inclined front edges of the notches 266 and 267, whenever the subtraction key 33 or the print only key 34 is depressed the bar 234 is moved forwardly and, by reason of the upward and forward inclination of the rear edges of these notches, the roller 272 or 274 will be engaged to hold the corresponding control key latched down until the roller 249 rides into the dwell of the cam disk 240 to permit the bar 234 to move forwardly and release the key. If the bar 234 is moved forwardly without depression of the subtraction key 53, depression of this key will be blocked by engagement of the roller 272 with the shoulder 268 and correspondingly, if the bar is moved forwardly without depression of the print only key 34, depression of this key will be blocked by engagement of the roller 274 with the shoulder 270. The shoulders 268 and 270 will thus block depression of the subtraction key 33 and the print only key 34 if any one of the control keys has been depressed prior to depression of one of these keys.

A left-hand clutch actuating bar 275 is disposed at the outer side of the left-hand frame plate 60 and between this plate and the stems 125 and 135 of the keyboard clear key 35 and the repeat addition key 36 and this bar is pivotally secured at its front end to the upper end of the arm 232 by a pivotal connection 276. At its rearward end the bar 275 is provided with a longitudinally extending slot 278 which receives a stud 279 projecting to the left from the rear portion of the frame plate 60 to guide the rear end of the bar. Intermediate its length the bar 275 is provided with a portion 280 of increased width substantially in registry with the key stems 125 and 135 and this portion of the bar is provided with upwardly opening, upwardly and forwardly inclined notches 281 and 282, the bar having flat top edge portions at the opposite sides of the open, upper ends of these notches.

A stud 283 projects to the right from the key stem 125 intermediate the length of this key stem and is receivable in the notch 281 and a similar stud 284 projects to the right from the key stem 135 intermediate the length of this key stem and is receivable in the notch 282. Because of the forwardly and upwardly inclined front edges of the notches 281 and 282, depression of either of the keys 35 or 36 will impart a forward movement to the bar 275 and this forward movement of the bar 275 will be transmitted through the shaft 230 and the arms 231 and 232 to the bar 234, imparting a forward movement to this bar to release the clutch 236 and close the motor switch 262. Because of the upwardly and forwardly inclined rear edges of the notches 281 and 282, either one of the keys 35 or 36 which is depressed to initiate a machine operating cycle will be retained in its depressed condition until the cycle has been completed and the clutch released, as explained above, and because of the flat top edge portions of the bar 275 at the opposite sides of the upper end of the notches 281 and 282, neither of the keys 35 nor 36 can be manually depressed if one of the other control keys has been previously depressed.

A bifurcated yoke member 285, Fig. 3, is mounted at its lower end on the shaft 230 and extends upwardly and forwardly from this shaft at the right-hand side of the stem 72 of the addition key, this yoke member having an upwardly opening notch 286 in its upper portion and arm 287 and 288 disposed at the forward and rearward sides, respectively, of the notch 286. The stud 79 on the addition key stem 72 is receivable in the notch 286 and, because of the upward and forward inclination of this notch, when the addition key is depressed, the yoke 285 is rocked forwardly to turn the shaft 230 in a direction to impart a forward movement to the clutch actuating bar 234 and, also because of the upward and forward inclination of the notch 286, once the addition key has been depressed to initiate a machine operating cycle, the rearward arm 288 of the yoke engages the stud 79 and holds the key depressed until the machine cycle has been completed and the key is released by the coincident rearward movement of the bar 234. The rearward arm 288 of the yoke 285 is shorter than the arm 287, so that if a control key other than the addition key is depressed to initiate the machine operating cycle, the rearward arm 288 moves under the stud 79 and blocks depression of the addition key.

As shown in Figs. 3, 8 and 15, a second yoke 290 is secured at its lower end on the shaft 230 and extends upwardly and forwardly from this shaft at the right-hand side of the total key stem 112, this yoke also having in its upper portion an upwardly opening and upwardly and forwardly inclined notch 291 which receives a stud 292 extending to the right from the intermediate portion of the key stem 112. As the notch in the upper portion of the yoke 290 is the same as the notch in the upper portion of the yoke 285, depression of the total key 37 will rock the yoke 290 and shaft 230 to impart a forward movement to the bar 234 and the total key will be latched down until the coincident operating cycle of the machine has been completed. In this case also, the rearward arm of the yoke moves under the stud 292 if a control key other than the total key is depressed so that the total key cannot be depressed after one of the other control keys has been depressed to establish a machine operating cycle.

The total key actuated yoke 290 is provided with an upwardly directed extension 296 above the notch 291 and this extension has a straight front edge 297 disposed in opposition to the lower end of the lever arm extension 222 described above in connection with Fig. 8, the arrangement being such that, if the "0" key or a digit key is initially depressed, the lever arm 222 will move in front of the yoke extension 296 and lock the shaft 230, the yokes 285 and 293 and the clutch actuating bars 234 and 275 against movement. With these elements locked against forward movement, if an attempt is made to depress any control key, the corresponding key stem carried stud or roller will bear against the upwardly and forwardly inclined front edge of the corresponding notch and the key cannot be depressed.

Conversely, if a control key is depressed prior to the attempted depression of a digit key or the "0" key, the yoke extension 296 will be moved to a position at the right-hand side of the lever arm extension 222 by the rocking of the shaft 230 and, since the locked arm 220 then blocks rotational movement of the shaft 14 and downward movement of the shaft or bar 227, neither the "0" key nor any digit key 30 can be depressed.

There is thus provided an interlocking mechanism between the "0" and digit keys and the control keys so that neither the "0" key nor any digit key can be depressed after a control key has been depressed and no control key can be depressed while a digit key is held in depressed position. In other words, an entry value made by the "0" and digit keys has to be completed, at least to the extent of releasing all of the keyboard keys, before a control key can be depressed to establish an operating cycle of the machine.

A third yoke 293 (Figs. 3 and 14), similar to the yoke 285, is secured at its lower end on the shaft 230 and extends upwardly and forwardly from this shaft at the right-hand side of the subtotal key stem 120. This yoke is provided in its upper portion with an upwardly and forwardly inclined notch 294 which receives a stud 295 projecting to the right from the intermediate portion of the key stem 120. Because of the inclination of the notch 294, a depression of the subtotal key 38 will rock the yoke 293 and the shaft 230 to impart a forward, cycle-establishing movement to the clutch actuating bar 234 and, because of the inclination of the rearward edge of the notch 294, the subtotal key will be latched down until the cycle is terminated and the bar 234 moves rearwardly. Also, if a total key other than the subtotal key is depressed to initiate the operating cycle, the rearward arm of the yoke 293 is moved under the stud 295 and the subtotal key cannot then be depressed until after the coincident operating cycle has been completed.

*Selection mechanism*

The selection mechanism, as shown in Figs. 4, 7 and 12, comprises a laterally shiftable cage disposed to the rear and somewhat below the keyboard of the machine and including left-hand and right-hand side plates 298 and 299 disposed in spaced-apart and substantially parallel relationship to each other, these plates being rigidly held in position relative to each other by transversely extending tie rods and other cage structure, as will be later described. The cage is slidably mounted on upper and lower guide rails 301 and 302 extending transversely of the machine in parallel relationship to each other rearwardly of the machine keyboard and the cage has a freedom of translational movement to the left from its right-hand home position for a distance at least as great as the width of the cage.

A selection sector axle 304 is disposed rearwardly of and parallel to the guide rails 301 and 302 and is supported at its ends in the cage side plates 298 and 299, and a plurality of selecting sectors 305 are journalled for angular movement on the axle 304 in spaced-apart, ordinal arrangement between the side plates 298 and 299 of the cage. Each selecting sector includes a hub portion 306 mounted on the axle 304, a toothed sector portion 307, disposed rearwardly of the axle 304 and supported on the hub by a suitable spoke structure, and a dial sector portion 308 disposed above and forwardly of the axle 304 and also supported on the hub 306 by a suitable spoke structure. The sectors 305 are all resiliently urged to turn in a clockwise direction, as viewed in Fig. 7, by individual springs 309 and are releasably latched in their "0" position against the force of the springs 309 by individual zero latch levers 310 rockably mounted on a shaft 311 in spaced-apart, ordinal arrangement. A stop pin cage, generally indicated at 312 extends between the cage side plates 298 and 299 forwardly of the selection sectors 305 and carries ordinally arranged rows of stop pins 314 which can be set by the digit keys of the keyboard to stop the corresponding selector sectors 305 at angular positions corresponding to selected digit values as the selection unit is stepped from right to left by the escapement mechanism which was previously described in connection with Fig. 8.

Eight pin setting bellcrank levers 315 are pivotally mounted at their angles, in side-by-side relationship, on a common arbor 316 disposed below and supported from the keyboard frame 318. Each of these levers has an upwardly directed, forward end portion 319, respectively positioned below the lower end portions 225 of the corresponding digit key stems 224 so that the associated pin setting lever will be rocked whenever a digit key from "1" to "8" is depressed, and having forwardly directed front end portions 320 which extend through a guide slot 321 in a fixed plate 322 and are disposed respectively in opposition to the forward ends of the stop pins 314 of the row of stop pins in registry with the slot 321 so that the corresponding stop pin can be set by depression of a selected digit key.

The "9" digit key does not set a stop pin but merely releases the zero latch 310 of the corresponding selector sector 305 permitting the spring 309 to turn the sector until the sector is stopped by a fixed stop rod 323 which also constitutes one of the tie rods of the selector mechanism cage.

The zero latch lever 310 in registry with a slot in the plate 322 is moved to sector releasing position upon depression of the "9" key by a lever 326 pivotally mounted intermediate its length on the pivot 326' and having its forward end upwardly directed and engaged under the bar 227 and its rearward end pivotally connected to the upper end of a link 327, the lower end of which is pivotally connected to a dog 328. The dog is mounted on a supporting plate and has a rearwardly directed upper end engageable under the forward ends of the zero latch levers 310 as these levers are stepped into alignment with the slot 321 in the plate 322 to rock the zero latch levers to sector releasing position. Depression of the zero lever does not set any of the stop pins or release any zero latch lever but merely operates the escapement mechanism to step the shiftable selection mechanism one space to the left.

The pin setting levers 315 are resiliently urged to their retracted position by springs 330 connected one between each lever 315 and a fixed bracket 331, the upper end of which is mounted on the arbor 316 and which is inclined downwardly and rearwardly from this arbor in forwardly spaced relationship to the plate 322. For a more detailed description of the selection mechanism, reference may be had to the application S. N. 407,016, referred to above.

Referring to Figs. 4, 10 and 11, a bracket 335 is mounted on the forward, left-hand portion of the machine base 20 and has a forwardly directed arm 336. An arbor 337 projects upwardly from the right-hand end of the bracket 335 and a bellcrank lever 338 is pivotally mounted at its angle on arbor 337 and has an arm 339 extending to the left from the arbor 337 and a second arm 340 extending rearwardly, the arm 340 being preferably made in two parts with an eccentric connection between the two parts for adjustment of the angular position of the distal portion of this arm. The distal end of the arm 340 is connected by a pivoted link 341 to the left-hand side plate 298 of the selection mechanism 198. A tension spring 342 connected between the forward end of the bracket arm 336 and the bellcrank lever arm 339 to the left of the arbor 337 resiliently urges the selection mechanism 198 to the left, movement of the selection mechanism to the left being controlled by the escapement mechanism previously described. A guide disk 345 is mounted on the lef-hand end portion of the machine cam shaft 238 and carries a stud 346 projecting to the left therefrom eccentrically of the cam shaft. An elongated hook link 347 is pivotally connected at its forward end to the distal end of the bellcrank lever arm 339 by a universal joint connection 348 and carries on its rearward end a downwardly directed hook formation 349 which is engaged by the stud 346 to pull the link 347 rearwardly during the latter portion of an operating cycle of the machine to return the selection mechanism 198 to its right-hand home position from a left-hand position to which the selection mechanism has been stepped during the entry of a value into this mechanism.

Addition control mechanism

Referring to Fig. 9, a bellcrank lever 350 is pivotally mounted at its angle on the front, right-hand frame plate 50 by a pivot pin 354 projecting to the right from the frame plate and this bellcrank lever has an upwardly directed arm 353 and a forwardly directed arm 352, the distal end portion of which underlies the stud carried roller 79 on the stem 72 of the addition key. The arm 352 is held against the roller 79 by a tension spring 351 connected between the bellcrank arm 353 and the frame plate 50 rearwardly of this arm. Whenever the addition key 32 is manually depressed, the bellcrank lever 350 is rocked in a counter-clockwise direction, as viewed in Fig. 9, against the force of spring 351. A lever 355 is pivotally mounted intermediate its length on a shaft 356 which extends between the rear frame plates 42 and 58 above and parallel to the cam shaft 238 and an elongated link 358 is pivotally connected at its front end to the upper end of the bellcrank lever arm 353 and extends rearwardly from the lever arm 353 past the upper end of the upwardly and forwardly inclined lever 355. Intermediate its length the link 358 is provided with a longitudinally extending slot 359 receiving a fixed stud 360 which guides the link for longitudinal movement forwardly and rearwardly of the machine. At its rear end the link carries a perpendicularly projecting stud 361 which bears against the upper end portion of the rear edge of the lever 355 to rock the lever 355 in a counter-clockwise direction, as viewed in Fig. 9, when the addition control key 32 is manually depressed.

An actuator axle 362 extends transversely of the machine rearwardly of and parallel to the cam shaft 238 and is supported at its ends in the frame plates 42 and 63. A plurality of actuator sectors 364 are journalled on the axle 362 in ordinal arrangement for angular movements about the axle. As is somewhat more fully shown in Fig. 14, these sectors are directed forwardly and upwardly from the axle 362 and are provided along their curved edges with gear teeth 365 and suitable mechanism driven from the cam shaft 238 is provided, as shown in application S. N. 407,016 referred to above, to impart first a downward and then an upward movement to the actuator sectors during each machine operating cycle. The actuating mechanism is releasably connected to the actuator sectors so that the sectors can be left at the end of the downward stroke of the operating mechanism in differentially set positions corresponding to the differentially set positions of the selection sectors 305 of corresponding orders as determined by the entry of a value into the selection mechanism by the keyboard or selection keys of the machine.

A positive transmission or pendant gear mechanism, generally indicated at 370, is disposed between the actuators sectors 364 and the selector sectors 305 and comprises a bail having spaced-apart and parallel bail legs, as indicated at 371, interconnected by a cross member 372 and gear axles 373, 374 and 375 extending through the bail legs and across the space therebetween in spaced-apart and parallel relationship to each other and at locations spaced apart longitudinally of the bail legs. A set of ordinally arranged transmission gears 376, equal in number to the number of actuator sectors 364, are journalled on the gear axle 373 at the rearward end of the group of gear axles. These gears 376 are constantly in mesh with the actuator sector gear teeth 365 and the teeth of ordinally arranged print wheel drive gears 378 journalled on the shaft 356 and effective to drive the type setting mechanism of the printing mechanism of the machine. The gear axle 373 is extended at both ends outwardly of the bail and is supported at its ends in the frame plates 42 and 63 to provide a pivotal support for the transmission mechanism 370.

A set of idler gears 380 are journalled in ordinal arrangement on the middle gear shaft 374 and mesh with the gears 376 and a set of transmission gears 381 are journalled in ordinal arrangement on the forward gear shaft 375 and mesh with the idler gears 380. The bail legs 371 extend rearwardly of the axle 373 and at the rear end of the bail one of these legs is provided with a perpendicularly disposed cross member 382 which extends perpendicularly to the right of the right-hand bail leg 371 and constitutes a shifting element for the positive pendant gear mechanism 370.

A pendant gear shifting cam 385 is mounted on the cam shaft 238 adjacent the right-hand side of the positive pendant gear mechanism 370. This cam has its peripheral edge divided into three portions including an intermediate portion 386 in which the positive pendant gear mechanism 370 is held in its intermediate or neutral position, as illustrated in Fig. 9, a high or lobe portion 387 which moves the gears 381 of the pendant gear mechanism into mesh with the teeth 388 of the corresponding selector sectors 307, and a low portion 389 which moves the gears 381 of the pendant gear mechanism into mesh with the teeth of corresponding accumulator drive gears 390 journalled in ordinal arrangement on an accumulator drive gear shaft 391 mounted at its ends on the frame side plates of the accumulator unit and disposed below and forwardly of the cam shaft 238 and parallel to the cam shaft.

A bellcrank lever 394 is pivotally mounted at its angle on a shaft 395 extending transversely of the machine and mounted in the machine frame side plates below and parallel to the cam shaft 238. This bellcrank lever has a rearwardly and upwardly directed arm 396 carrying at its distal end a cam following roller 397 riding on the peripheral edge of the cam 385. The lever 394 also has a rearwardly directed arm 398 and a downwardly and rearwardly directed third arm or tail portion 399 and a tension spring 400 is connected between the distal end of the arm 399 and the frame side plate 42 above the arm 399 to resiliently hold the cam following roller 397 against the peripheral edge of the cam 385.

A link 402 is pivotally mounted at its lower end on the distal end of the arm 398 of the bellcrank lever 394 by a pivotal connection 403 and extends upwardly and forwardly from the pivotal connection 403 past the forward side of the pendant gear shifting element 382. At its upper end the link 402 is provided with a rearwardly directed hook formation 404 and at a location spaced therealong from the hook formation with a rearwardly extending shoulder 405, the space between the hook formation 404 and the shoulder 405 providing a rearwardly opening notch 406 in which the pendant gear shifting element 382 is received when the addition control key is in key-down position, as illustrated in Fig. 9.

An extension 407 projects forwardly from the link 402 intermediate the length of the link and a tension spring 408 connected between the distal end of this extension and the bellcrank lever arm 398 forwardly of the pivotal connection 403 resiliently urges the upper end portion of the link 402 forwardly and away from the pendant gear shifting element 382. The lower end portion of the lever 355 comprises a bifurcated formation providing a downwardly opening notch 409 extending longitudinally of the lever. A stud 410 projects to the right from the upper portion of the link 402 and is slidably received in the notch 409 so that, when the lever 355 is rocked in a counter-clockwise direction, as viewed in Fig. 9, by depression of the addition control key, as explained above, the lower end of the lever 355 acting on the stud 410 moves the upper end of the link 402 rearwardly until the pendant gear shifting element 382 is received in the notch 406 in the upper end portion of the link 402.

With the mechanism illustrated in Fig. 9, when the control key is depressed and establishes an operating cycle of the cam shaft 238, it simultaneously swings the upper end of the link 402 rearwardly to engage the positive pendant gear shifting element 382 in the notch 406 of the link. The angular relationship of the cam 385 is such that immediately after the beginning of the coincident operating cycle, the cam follower 397 rides up on the lobe 387 of the cam, pulling the link 402 downwardly and swinging the positive pendant gear mechanism to mesh the gears 381 thereof with the teeth 307 of the selector sectors 305 of the corresponding orders. The lobe portion 387 of the cam 385 extends through the first half of the operating cycle during which time the actuator sectors are moved down to their differentially set positions in which they are stopped as the corresponding selector sectors 307 are turned from the differentially set positions of these sectors to their "0" positions. During this first portion of the operating cycle the printing mechanism is driven from the actuator sectors 364 through the transmission gears 376 and the print wheel drive gears 378 to set the type of the printing mechanism to print the number which was entered into the selection mechanism from the keyboard mechanism of the machine and at the end of this first portion of the cycle, printing of the entry number occurs. The actuator sector drive mechanism is arranged to provide a pause or dwell of the drive mechanism at the end of the downward stroke thereof and during this dwell of the actuator sectors at their lowermost position while printing takes place, the cam follower 397 rides off of the lobe 387 and into the low portion 389 of the cam 385. The spring 400 rocks the bellcrank lever 394 in a direction to move the link 402 upwardly and shift the positive pendant gear mechanism 370 to bring the gears 381 out of mesh with the selector sectors 307 and into mesh with the accumulator drive gears 390 of the corresponding orders. As the actuator sectors are moved back to their home position after the dwell at their lowermost position, they drive the accumulator drive gears 390 through the positive transmission or pendant gear mechanism to enter the same value into the accumulator of the calculating machine. Near the end of the upward movement of the actuator sectors and after the value has been fully entered into the accumulator, the cam follower 397 rides up onto the intermediate portion 386 of the cam 385 to return the positive pendant gear mechanism to its centered or neutral position, as illustrated in Fig. 8, in which the gears 381 are out of mesh both with the actuator sectors 307 and the accumulator drive gears 390, and during which portion of the cycle the selector mechanism is returned to its right-hand, home position, as explained above.

The positive pendant gear unit 370 is resiliently retained in its centered position by a centering device, generally indicated at 412 and shown in Fig. 13, including a pair of opposed jaws 414 and 415 pivotally mounted at corresponding ends on the bail leg 371 of the pendant gear unit and extending past respectively opposite sides of the pendant gear shifting element 382. A fixed stud 416 is disposed between the distal or free ends of the jaws 414 and 415 and a tension spring 417 resiliently pulls the jaws together and against the stud 416 to resiliently force the shifting element 382 to a position corresponding to the neutral or centered position of the gear unit 370.

*Subtraction control mechanism*

A bellcrank lever 420, Fig. 13, smaller than the lever 350, is disposed adjacent the upper portion of the subtraction key stem 85 and pivotally mounted at its angle on a pivot pin 421 projecting to the right from the frame plate 50. This bellcrank lever has a forwardly directed arm 422 carrying at its distal end a stud 423 projecting to the left from the lever arm and received in the upper portion of the slot 90 in the subtraction key stem. The bellcrank lever also has an upwardly directed arm 424 carrying at its upper or distal end a stud 425 extending to the right from the lever arm. An elongated link 426 extends past the upper portion of the key stem 85 substantially perpendicular to the key stem and is provided rearwardly of the key stem with a longitudinally extending slot 427 receiving a fixed stud 428 which guides the link for longitudinal movement. Forwardly of the key stem 85 the link 426 is provided with a second longitudinally extending slot 429 receiving a fixed stud 430 which guides the forward end portion of the link for longitudinal movement of the link. A tension spring 431 connected at one end to the front end of link 426 and connected at its other end to a fixed stud 432 resiliently urges the link in a rearward direction. Intermediate its length the link 426 is provided with a transversely elongated recess 434 which receives the stud 425 carried by the bellcrank lever 420 so that a forward movement will be imparted to the link when the subtraction control key 86 is manually depressed, and near its rearward end the link carries a stud 435 projecting to the left from the link.

An upwardly and forwardly directed lever 436 is pivotally mounted intermediate its length on the shaft 356 and has the upper portion of its rear edge disposed in front of the stud 435 and in contact therewith so that this lever will be rocked in a counterclockwise direction, as illustrated in Fig. 13, when the link 426 is moved forwardly by depression of the subtraction control key 33, as described above. A link 438 is pivotally mounted at its lower end on the distal end of the arm 398 of the bellcrank lever 394 by the pivotal connection 439 and extends upwardly and forwardly from the connection 439 past the forward side of the shifting element 382 of the positive transmission gear mechanism 370. This lever is provided on its upper end with a hook formation 440 adapted to engage the upper edge of the shifting element 382 but does not have a shoulder formation corresponding to the shoulder formation 405 of the link 402. The lower end portion of the lever 436 comprises a bifurcated formation 441 providing a downwardly opening notch 442 extending longitudinally of the lever. A stud 443 projects to the right from the upper end portion of the link 438 and is received in the notch 442 to move the upper end of the link 438 rearwardly and engage the hook formation 440 with the transmission gear shifting element 382 when the lever 436 is rocked in a counter-clockwise direction by depression of the subtraction control key 33. With the subtraction control key depressed to establish a machine operating cycle, at the beginning of this cycle when the cam follower 397 moves from the intermediate portion 386 of the cam 385 to the lobe portion 387 of the cam, the link 438 is pulled down by the bellcrank lever 394, swinging the pendant gear mechanism 370 to mesh the gears 381 thereof with the teeth of the selection sectors 307 of the corresponding orders during the first portion of the operating cycle so that the value corresponding to the differentially set positions of the selection sectors will be transmitted to the printing mechanism of the machine, as described above, and printed during the time the actuator sectors 364 are in the dwell at the bottom of their downward movement.

A bellcrank lever 445 is pivotally mounted intermediate its length on a pivot pin or stud 446 extending to the right from the frame plate 50 below the cam shaft 238. This lever has a forwardly directed arm 447, the distal end of which rides on an offset tongue formation 448 on the rearward end of the lever 93 which is rocked in a counter-clockwise direction as viewed in Fig. 13 when the subtraction control key 33 is depressed, as described above. The lever 445 also has an upwardly and rearwardly directed arm 449 provided at its upper, distal end with a rearwardly directed hook formation 450 which rides over the upper edge of the positive pendant gear unit shifting element 382 when the lever 445 is rocked in a clockwise direction incident to the rocking of lever 93 in a counter-clockwise direction to positively restrain the positive pendant gear unit from shifting to mesh its gears 381 with the accumulator drive gears 390 at any time while the subtraction control key is depressed. The lever arm 449 also has, intermediate its length, a forwardly directed hook formation 451 which is released from engagement with a ribbon shifting member 452 when the subtraction control key is depressed so that the ribbon shifting mechanism is freed to shift a bicolored ribbon to print the subtracted value entered by depression of the subtraction control key in a distinctive color, as is set forth in detail in application S. N. 407,016, referred to above.

An arm 454 projects forwardly from the lower portion of link 438 and a tension spring 455 connected between this arm and the arm 398 of bellcrank lever 394 at a location spaced from the link 438, resiliently urges the upper end of the link 438 forwardly and away from the shifting element 382. The mechanism is illustrated in Fig. 13 in the key-down position of the subtraction control key so that the upper end of the link is moved into engagement with the shifting element 382 against the force of spring 455.

A negative transmission gear or pendant unit, generally indicated at 456, is disposed below the cam shaft 238 and comprises a bail structure including spaced-apart and parallel legs, as indicated at 457, joined together intermediate their length by a cross-bar or strut formation 458 and gear axles 460 and 461 extending through the legs and across the space therebetween in spaced and parallel relationship to each other and at locations spaced apart longitudinally of the bail legs, the axle 461 being disposed adjacent the front end of the bail. At its rear end the bail of the gear unit 456 is pivotally mounted on the shaft 446 so that the unit can swing up and down for a purpose to be presently described.

A set of ordinally arranged transmission gears 462 are journalled on the gear axle 460 between the bail legs and a set of similar transmission gears 463 are journalled in ordinal arrangement on the gear axle 461 between the bail legs and are positioned to mesh with accumulator drive gears 390 of corresponding orders when the negative pendant gear unit is swung upwardly.

The right-hand end of the gear axle 460 projects outwardly of the right-hand leg 457 of the negative pendant gear unit bail and the forward or distal end of the arm 454 is provided with an offset tongue 465 extending to the left from the arm and engageable under the right-hand end of the shaft 460 when the subtraction control key is depressed, as illustrated in Fig. 13.

After the printing has been accomplished and before the upward movement of the actuator sectors begins in a subtractive entry cycle of the machine, the cam follower 397 rides off of the lobe portion 387 of the cam 385 into the low portion 389 of the cam and the spring 400 then rocks the bellcrank lever 394 in a counterclockwise direction, as viewed in Fig. 13 raising the link 438 and the arm 454 of this link. As the link 438 is now raised, the tongue 465 engages under the right-hand end of the shaft 460 and swings the negative pendant gear unit upwardly to mesh the gears 463 with the accumulator drive gears 390 so that, during the upward movement of the accumulator sectors from their differentially set positions during the latter portion of the coincident operating cycle, the value which was entered into the printing mechanism will be entered negatively into the accumulator of the machine. It will be noted that the positive pendant gear unit has an odd number of gear sets, three being illustrated, and that the negative pendant gear unit has an even number of gear sets, two being illustrated, so that the same upward movement of the actuator sectors will rotate the accumulator drive gears 390 in one direction when the gears 381 of the positive pendant gear unit are meshed with the accumulator drive gears and will rotate the accumulator drive gears in the opposite direction when the gears 463 of the negative pendant gear unit are meshed with the accumulator drive gears.

When the negative entry cycle has been completed, and the subtraction control key released, as described above, the link 426 and lever 436 are released and the upper end of the link 438 is moved forwardly so that its terminal hook formation 440 is disposed forwardly and clear of the positive pendant gear unit shifting element 382. At the same time the arm 454 is moved forwardly so that the tongue formation 465 is moved forwardly and clear of the right-hand end of the gear axle 460 thereby releasing the negative pendant gear unit 465 to return to its neutral position and out of mesh with the accumulator drive gear, as illustrated in Fig. 13, this movement of the negative gear unit being accomplished by a spring 466.

With the above-described arrangement, the value to which the selector sectors 305 have been differentially set is first transferred to the printing mechanism by the positive pendant gear unit 370, is printed after the selector sectors have been returned to their home or "0" position, and the same value is then transferred negatively from the actuator sectors through the negative pendant gear 456 to the accumulator while the actuator sectors are being restored to their upper or full-cycle position and the printing mechanism is bein zeroized.

Repeat addition control cycle

A bail, generally indicated at 468 in Fig. 10, has a left-hand leg 469 pivotally mounted near its rear end on the shaft 230 near the left-hand end of this shaft and extending forwardly from the shaft and a right-hand leg 470 pivotally mounted intermediate its length on the right-hand portion of the shaft 230. A two-part bight or cross member 471 extends between the forward ends of the legs 469 and 470 forwardly of the shaft 230 and interconnects the legs 469 and 470 for simultaneous and coextensive rocking movements about the shaft 230. The forward portion of the upper edge of the left-hand bail leg 469 is disposed below a stud 472 which projects to the left from the lower end portion of the repeat addition key stem 135 and the lower edge of the forward end portion of the leg 470 rides on a stud 473 which projects to the right from a forwardly extending arm 474 of the "add" key operated bellcrank lever 350.

With this arrangement, when the repeat addition control key is depressed, the bellcrank lever 350 is rocked to establish an addition control cycle of the machine in the same manner as the addition cycle is established by depression of the addition control key, as described above. Depression of the repeat addition control key, however, accomplishes certain other operations which serve to maintain the entry value in the machine for a plurality of successive addition cycles.

A shaft 475 extends transversely of the machine in front of and parallel to the cam shaft 238 and this shaft is slidably mounted at its ends in the left and right-hand side frame plates of the machine for longitudinal movement. A pair of disks 476 and 477 are mounted on the shaft 475 near the left-hand end of the shaft and are spaced apart to receive the intermediate portion of the hook link 374 therebetween. The portion of the hook link disposed immediately above the shaft 475 is provided with a downward extension 478 of rounded configuration which rides on a collar 479 mounted on the shaft 475 between the disks 476 and 477, this extension acting as a cam to release the hook 349 from the stud 346 when the hook link has been pulled rearwardly a sufficient distance to fully return the selection mechanism unit to its right-hand, home position. The link is resiliently held down to maintain the extension 478 in contact with the collar 479 by a tension spring 480 connected between the bellcrank lever 338 and the hook link at a location rearwardly of the connection 348 between the forward end of the hook link and the lever 338.

A second collar 482 is mounted on the shaft 475 at a location spaced to the right from the collar 479 and a compression spring 483 surrounding the shaft 475 between the left-hand outboard plate 65 and the left-hand disk 476 resiliently urges the shaft to a right-hand home position in which the rearward end portion of the hook link 347 is adjacent the left-hand side of the guide disk 345 on cam shaft 238 and the hook 349 is in position to be engaged by the stud 346 when the machine cycles. A bellcrank lever 485 is pivotally mounted at its angle on a pivot stud 486 carried by a bracket 487 mounted on and projecting to the left from the left-hand rear frame plate 58 immediately above the shaft 475. This bellcrank lever has a downwardly extending arm 488, the lower end portion of which engages the right-hand side of the collar 482 on the shaft 475 and an arm 489 extending to the right from the pivot stud 486 and provided at its distal end with a forwardly directed, perpendicularly offset tongue formation 490.

An extension 492 projects rearwardly from the intermediate portion of the repeat addition key stem 135 and rides on the top of the tongue formation 490 of the bellcrank lever 485 so that, when the repeat addition key is depressed, the bellcrank lever 485 is rocked on the pivot stud 486 moving the lower end of its arm 488 to the left and shifting the shaft 475 and disks 476 and 477 to the left against the force of spring 483, as shown in Fig. 11. This moves the rear end of the hook link 347 to the left so that, when the repeat addition key is depressed, the stud 346 misses the hook 349 on the rear end of the link 347 and the link is not pulled rearwardly to return the shiftable selection mechanism to its right-hand home position.

A bail, generally indicated at 493, Figs. 11 and 12, and of rectangular shape, is disposed in the space between the right-hand home position of the left-hand side plate 298 of the shiftable selection unit 198 and the frame side plate 60 and comprises a pair of spaced-apart and parallel legs 494 and 495 disposed in upwardly and forwardly inclined position and a cross member 496 extending between the rearward edges of the legs 494 and 495. At their upper ends the bail legs are pivotally mounted on a shaft 497 which extends transversely of the machine immediately below the forward portion of the keyboard frame and is supported at its left-hand end on the frame plate 60 and at its right-hand end on a bracket plate 498 extending upwardly from the base 20 between and parallel to the frame plates 50 and 60. The left-hand bail leg 494 is provided with an extension 500 inclined forwardly and downwardly from the bottom end of this bail leg, which extension is provided with a downwardly and forwardly inclined slot 501 which receives a stud 502 projecting to the right from the bottom end of the repeat addition key stem 135. When the repeat addition key is depressed, as illustrated in Fig. 12, the lower end of the bail 493 is rocked rearwardly and the bail cross member 496 is provided along its lower edge with a rearwardly directed flange or ledge 503 which, as the shiftable selection mechanism is stepped to the left, as explained above, during a digitation operation, overlies the upper edges of the forward ends of those zero latch levers 310 disposed to the left of the home or full-cycle position of the left-hand zero latch lever.

With this arrangement, when the actuator sectors 364 return the selector sectors 305 from their differentially set positions to their "0" positions during the first portion of a machine operating cycle, the forwardly directed nose portions 504 of the live points 505, pivotally mounted one on each selector sector 305 at the forward end of the rack portion 307 of each sector, cannot pass the rearward ends of the locked down zero latch levers and the selector sectors thus cannot be relatched in their "0" position but will be returned by their springs 309 to their differentially set positions as soon as the gears 381 of the positive pendant gear unit 370 are moved out of mesh with the selector sector teeth, as explained above.

Thus, when the repeat addition key is depressed, as shown in Fig. 12, the shiftable selector unit is retained in the position to which it has been stepped to the left by the entry of the digit value into the selector mechanism and, upon completion of each repeat addition cycle of the machine, the selector sectors which have been differentially set are returned to their differentially set positions so that the entry value is retained in the selector unit and can be transferred to the printing mechanism and the accumulator mechanism as often as the machine is cycled by depression of the repeat addition control key.

*Subtotal control mechanism*

As shown in Fig. 14, bail 507 is rockably mounted on the shaft 209 between the frame side plates 50 and 60 and this bail has an arm 508 extending upwardly from the shaft 209, an arm 509 extending downwardly from the shaft 209, and arm 510 projecting forwardly from the shaft 209 and a cross member 511 extending to the left from the forward end of the arm 510 and past the front edge of the stem 120 of the subtotal key 38. The downwardly extending arm 509 engages at the lower end of its front edge with the rear side of the shaft 78 to limit rocking movement of the bail 507 to the home or full-cycle position of the bail and an extension 512 projects forwardly from the key stem 120 immediately above the cross member 511 of the bail so that the bail is rocked in a counter-clockwise direction, as viewed in Fig. 14, when the subtotal key 38 is depressed.

An elongated link 514 is pivotally connected at its forward end to the upper end of the bail leg 508 by a pivot stud 515 and extends rearwardly from the bail leg 508 being guided intermediate its length in a slotted bracket 516 secured on a fixed part 517 of the machine frame. A shaft 518 is supported by the frame plates 42 and 63 forwardly of and parallel to the print mechanism drive gear shaft 356. A bail, generally indicated at 520, of irregular shape, is rockably mounted on the shaft 518 and has an arm 521 extending upwardly and forwardly past the rearward end portion of the link 514, an upwardly directed arm 522, a rearwardly directed arm 523 offset to the left from the arm 522 and terminating at its rearward end in a downwardly extending hook formation 524, and a transverse bridge element 525 joining the forward end portion of the arm 523 to the upper end portion of the arm 522. A fourth arm 526 of the bail 520 extends from the shaft 518 along the arm 521 but spaced to the left from this arm with its distal end disposed intermediate the length of the arm 521, the proximal end of the arm 526 being joined to the proximal end portion of the hook arm 523.

The link 514 carries at its rearward end a stud 528 projecting to the left from the link and engaging the rearward edge of the distal end portion of the bail arm 521 to rock the bail 520 in a counter-clockwise direction, as viewed in Fig. 14, when the link 514 is moved forwardly coincident to a depression of the subtotal key 38. Counter-clockwise rotational movement of the bail 520 raises the hook formation 524 on the distal end of the bail arm 523. It will be noted that a print spacing control lever 529 has its forward end portion disposed alongside the rearward end portion of the arm 523 and carries a stud 530 riding on the upper edge of the arm 523 so that the spacing lever will be moved to cause the tape feed mechanism to double space whenever the bail 520 is rocked by depression of the subtotal control key, the tape feed mechanism and spacing control therefor being disclosed in detail in application S. N. 407,016 referred to above.

A bellcrank lever 532 is pivotally mounted at its angle on a pivot pin 533 supported between the frame plates 42 and 63 below the print wheel drive gear shaft 356. This bellcrank lever has an upwardly extending arm 534 terminating at its upper end in an abutment formation 535 directed to the right and disposed in position for engagement by the hook 524. The bellcrank lever 532 also has a rearwardly directed arm 536 carrying at its rear end a cam following roller 537 which rides on the peripheral edge of the subtotal control cam 538 mounted on the machine cam shaft 238.

In addition to the accumulator drive gears 390 journalled on the drive gear shaft 391, the accumulator mechanism includes accumulator gears 540 journalled in ordinal arrangement on the accumulator gear shaft 541 and meshing with corresponding drive gears 390, tens-transfer mechanism and "fugitive 1" entering mechanism, as is fully disclosed in the copending application S. N. 407,016 referred to above, and an algebraic sign sensing member 542 pivotally mounted on the shaft 541 and having adjacent the shaft a crosshead 543, the opposite end portions 544 and 546 of which are disposed substantially in a plane including the axis of the accumulator gear shaft 541 and extend substantially equal distances to respectively opposite sides of this shaft. The free end of the member 542 is spaced from the shaft 541 in a direction away from the shaft 391 and carries an offset abutment formation 547 which is engaged by elements of the "fugitive 1" supplying mechanism of the accumulator to position the member 542 in one predetermined angular position when the algebraic sign of the balance in the accumulator is positive and in a different predetermined angular position when the algebraic sign of the balance in the accumulator is negative.

A bellcrank lever 548 is pivotally mounted at its angle on a shaft 549 disposed parallel to and somewhat below and forwardly of the accumulator gear shaft 541 and is spaced from the right-hand end of the set of accumulator gears 540. This bellcrank lever has an upwardly extending arm 550, the upper end portion of which is disposed forwardly of the end portion of the positive pendant gear shaft 375 which extends to the right of the positive pendant gear bail; and has intermediate its length and at its rearward edge an abutment formation 551 which is disposed in opposition to the outer end of the end portion 544 of the crosshead 543 of the sign sensing member 542. The bellcrank lever 548 also has a rearwardly extending arm 552 which extends below the accumulator gear shaft 541 and is provided at its rearward, distal end with a downwardly extending hook formation 553.

A bellcrank lever 555, similar to and complementary to the bellcrank lever 548, is pivotally mounted at its angle on a shaft 556 disposed somewhat below, rearwardly of and parallel to the accumulator drive shaft 541. The bellcrank lever 555 is substantially opposite the lever 548 and has an upwardly extending arm 557, the upper end portion of which is disposed rearwardly of the right-hand end portion of the gear shaft 461 projecting to the right from the right-hand leg of the bail of the negative pendant gear unit 456. The lever arm 557 has intermediate the length of its forward or inner edge an abutment formation 558 disposed in opposition to the outer end of the end portion 546 of the crosshead of the sign sensing member 542. The bellcrank lever has a forwardly extending arm 559 provided at its forward or distal end with a downwardly extending hook formation 560. A tension spring 562 is connected between the bellcrank lever arms 550 and 557 and resiliently urges these arms toward each other. The distal end portions of the arms 552 and 559 overlap so that the downwardly extending hook formations 553 and 560 have their inner edges spaced apart and mutually opposed.

A roller 563 is disposed between the hook formations 553 and 560 and below the bellcrank lever arms 552 and 559 and is mounted on a stud 564 carried at the lower end of a link 565, the upper end of which is pivotally mounted on a stud 566 which carries the cam following roller 537.

With the above-described mechanism, when the subtotal key 38 is depressed to establish an operating cycle of the machine, as described above, it also rocks the bail 507 and imparts a forward movement to the link 514 which rocks the bail 520 and releases the hook 524 from the abutment 535 on the upper end of the arm 534 of the bellcrank lever 532. This releases the cam follower 537 to follow the contour of the cam 538 under the influence of the spring 562. When the cam follower 537 rides from its home or full-cycle position on the lobe 567 of cam 538, the link 565 and roller 563 are lowered releasing the bellcrank levers 548 and 555 to rock toward each other about the corresponding shafts 549 and 556 under the influence of the spring 562. If the balance in the accumulator has a positive algebraic sign, the sign sensing member 542 will be in position to block the bellcrank lever 555 while freeing the lever 548 to move inwardly so that the upper end of the arm 550 of this lever will engage the right-hand end portion of the positive pendant gear shaft 375 and shift the positive pendant gear unit 370 to bring the gears 381 of this unit into mesh with the accumulator drive gears 390. While the actuator sectors 364 are being moved downwardly during the first portion of the coincident operating cycle, the total in the accumulator will be read out by the positive pendant gear unit and transferred to the printing mechanism through the print mechanism drive gears 378 and at the end of the downward movement of the actuator sectors this value will be printed. As the lobe 567 of the cam 538 is of limited angular extent, the cam following roller 537 will remain in the low portion of this cam while the actuator sectors 364 are being moved upwardly to their home position during the latter portion of the coincident operating cycle of the machine. During this upward movement of the actuator sectors, the print wheels will be returned to their "0" positions and the total read out from the accumulator will be returned to the accumulator, in the same manner that a selection value is positively or additively entered into the accumulator, so that the accumulator will retain its previous positive balance. At the end of the cycle the cam lobe 567 rides under the cam follower 537 moving the link 565 upwardly and the bellcrank levers 548 and 555 outwardly, the outward movement of the lever 548 freeing the positive pendant gear unit 370 to return to its centered or neutral position out of mesh with the accumulator drive gears 390.

If the balance in the accumulator at the time the subtotal control key is depressed has a negative algebraic sign, the sign sensing member 542 will be positioned, as illustrated in Fig. 14, to block the bellcrank lever 548 while permitting the bellcrank lever 555 to swing inwardly under the influence of the spring 562 when the link 565 and roller 563 are lowered by the riding of the cam follower 537 off of the lobe 567 of the cam 538. The upper end portion of the arm 557 of the lever 555 will then engage the right-hand end portion of the gear shaft 461 of the negative pendant gear unit 456 and shift this unit to mesh the gears 463 thereof with the accumulator drive gears 390. Under these conditions, as the actuator sectors are moved downwardly, the negative total in the accumulator will be read out by the negative pendant gear unit and transmitted to the printing mechanism and will be restored in a subtractive manner to the accumulator when the actuator sectors are returned upwardly to their home, or full-cycle, position.

*Total control cycle*

As shown in Figs. 15 and 16, a bail 570 is mounted on the shaft 209 within the bail 507 of the subtotal key. This bail 570 has a downwardly extending arm 571, the lower end of the front edge portion of which is opposed to the rearward side of the shaft 78 to provide a limit stop for rocking movement of the bail about the shaft 209 to its home or full-cycle position. The bail 570 also has an upwardly extending arm 572 above the shaft 209 and an arm 573 extending forwardly from the shaft 209 and provided at its front end with a perpendicularly offset tongue formation 574 extending under an abutment formation 575 on the total key stem 112. When the total key 37 is depressed, this abutment formation 575 engages the upper edge of the bail cross member 574 and rocks the bail 570 in a counter-clockwise direction, as viewed in Fig. 15. A link 578 is pivotally connected at its front end to the upper end of the upwardly extending bail arm 572 by a pivot pin 579 and extends rearwardly from the arm 572. A lever 580 is pivotally mounted intermediate its length on the shaft 518 and has an arm 581 extending upwardly and forwardly from the shaft 518 past the rear end portion of the link 578 and an arm 582 extending downwardly and rearwardly from the shaft 518. The link 578 is guided intermediate its length in the notched bracket 516 and carries near its rearward end a laterally projecting stud 583 which bears against the rearward edge of the upwardly projecting arm 581 of the lever 580. This lever arm 581 also has on its rearward edge a laterally projecting tongue or abutment formation 584 which overlies the upper portion of the rear edge of the arm 526 of the bail 520 to rock the bail 520 simultaneously with the rocking of the lever 580, both the lever 580 and the bail 520 being rocked on a counterclockwise direction, as viewed in Fig. 15, when the total key 37 is depressed to shift the link 578 forwardly, as explained above.

A bellcrank lever 585 is pivotally mounted at its angle on the shaft 533 and has an upwardly and rearwardly directed arm 586, the upper end of which is disposed rearwardly of the abutment 535 on the upper end of the arm 534 of the lever 532. The bellcrank lever 585 also has a rearwardly directed arm 587 carrying at its rearward or distal end a cam following roller 588 which rides on the peripheral edge of the total control cam 590 mounted on the cam shaft 238 beside the subtotal control cam 538.

An arm 591 is pivotally mounted at its rearward end on the upper end of the bellcrank lever arm 586 by a pivot pin 592 and has a downwardly extending tail portion 593, the distal end of which bears against a stop formation 594 projecting laterally from the intermediate portion of the rear edge of the arm 586 to provide a limit stop for downward angular movement of the lever 591 at a position of this lever in which the forward or distal end thereof is slightly below the abutment 535 on the upper end of the lever arm 534. The arm 591 is resiliently urged to its limiting lower position by a tension spring 595 connected between a stud 596 projecting from the forward end of the lever arm 591 and an ear formation 597 on the lever arm 586 adjacent the shaft 533.

When the lever 580 is rocked by depression of the total control key, as explained above, it rocks the bail 520 to lift the hook 524 from the abutment 535 and the downwardly extending arm 582 of the lever 580 rides under the stud 596 on the distal end of the arm 591 and raises the distal or forward end of this arm until a forwardly facing shoulder 597 of the arm is raised past the rear edge of the abutment 535 to lock the bellcrank levers 520 and 585 together for simultaneous and coextensive rocking movement.

When an operative cycle of the machine is established and the bellcrank levers 532 and 585 are rocked in the manner indicated above by depression of the total key 37, near the beginning of the downward movement of the actuator sectors 364 in the coincident operating cycle, the cam follower roller 588 rides off of the lobe 598 of the cam 590 into the low portion of this cam thereby lowering the link 565 and roller 563 to free the bellcrank levers to swing toward each other under the influence of the tension spring 562 connected between the upwardly extending arms 550 and 557 of these bellcrank levers. The positive bellcrank lever 548 or the negative bellcrank lever 555 will be rocked, depending on the position of the sign sensing member 542 of the accumulator and will move the positive pendant gear unit 370 or the negative pendant gear unit 456 into mesh with the accumulator drive gears 390, as the case may be. The selected pendant gear unit will remain in mesh with the accumulator drive gears during the downward movement of the actuator sectors during which time the total is read out from the accumulator and transferred to the printing mechanism and printed. However, as the lobe 598 of the cam 590 extends through an arc of approximately 180 degrees, when the actuator sectors are started upwardly toward their full-cycle position, the cam follower 588 rides up on the lobe 598 of the cam 590 and disengages the pendant gear unit from the accumulator drive gears, thereby leaving the accumulator in a cleared or zeroized condition at the end of a total taking cycle.

Fig. 16 illustrates the relative position of the conditioning elements of the subtotal and total cycle control mechanism at an intermediate stage of a subtotal taking cycle and clearly illustrates that there are different subtotal and total control cams and separate cam followers for these cams.

The links 514 and 578 are provided near their forward ends with upwardly opening notches 600 and 601, respectively, which notches are in registry with each other when the subtotal and total keys are both in raised position. A stud 602 projecting to the left from the upper, rearward portion of the addition key stem 72 is disposed above the open, upper ends of these notches when the addition key is in raised position and moves downwardly into the notches when the addition key is depressed so that the total or subtotal key cannot be actuated while the addition key is depressed. Also, the links are provided with flat top edges at the rearward sides of the corresponding notches which move under the stud 602 and preclude depression of the addition key if either the subtotal or the total control key is depressed. This is an additional safety feature which precludes simultaneous depression of the addition control key and either the subtotal or total control key.

Intermediate their lengths the links 514 and 573 are provided with downwardly opening notches 603 and 604, respectively, and a stop member 605 movably mounted on the upper portion of the shiftable selector unit 198 engages in these notches when the selector unit is in any position other than its right-hand, home position, to prevent the establishing of a subtotal or total taking cycle while the selector mechanism is stepped to the left from its home position and in position to be accidentally engaged by the positive pendant gear unit 370. This is also an additional safety feature to preclude the possibility of a machine error during a subtotal or total taking cycle.

*Print only control cycle*

The print only control cycle, as illustrated in Fig. 17, is the same as the subtraction cycle illustrated in Fig. 13 and described above, except that in the print only cycle the negative pendant gear unit 456 is blocked from entering the digitation value subtractively into the accumulator mechanism of the machine after the value has been entered in the printing mechanism and printed.

An extension 605 projects forwardly and upwardly from the intermediate portion of the forward edge of the print only key stem 102 and the distal end portion of this extension has a lower edge substantially perpendicular to the longitudinal center line of the key stem and overlying the stud 423 carried at the outer end of the arm 422 of the subtraction key actuated bellcrank lever 420. Depression of the print only key will thus rock the bellcrank 420 counter-clockwise as illustrated in Fig. 17, move the link 426 forwardly and establish a subtraction cycle of the machine in the manner described above.

The lever 109 pivoted intermediate its length on the stud 94 and having its forward end disposed below the stud 108 carried at the lower end of the print only key stem 102, has an arm 606 extending rearwardly from the stud 94 and provided at its rearward end with a perpendicularly offset abutment formation 607. A stud 608 is carried by the arm 395 of the bellcrank lever 394 intermediate the length of this arm and projects to the right from the bellcrank lever arm in position to engage the stop 607 when the stop is raised by counter-clockwise rocking of the lever 109 incident to depression of the print only key 34.

When the print only key is depressed, it establishes a subtraction cycle of the machine, as stated above, and simultaneously rocks the lever 109 to raise the stop 607 into opposition with the stud 608. During the first portion of the subtraction cycle, the positive pendant gear unit 370 is swung by the cam 385, bellcrank lever 394 and link 438, in the manner described above, to mesh the pendant gears 381 with the rack teeth 388 of the selector sectors 305 which have been stepped to the left during the entry of the value to be printed. During the downward movement of the actuator sectors 364, the entry value is transferred from the differentially set selector sectors to the printing mechanism and printed. However, when the cam follower 397 rides off of the cam lobe 387 as the actuator sectors start their upward movement to their full-cycle position, the stud 608 on the bellcrank lever 394 engages the stop 607 on the rear end of the lever 109 so that the cam follower 397 can no longer follow the contour of the cam 385. This prevents the spring 400 from raising the link 438 and link arm 454 to shift the negative pendant gear unit 456 to bring the gears 463 of this unit into mesh with the accumulator drive gears 390 to enter the value into the accumulator. At the end of the cycle, when the key 34 is released, the cam follower 397 is on the intermediate portion 386 of the cam 385 so that the link arm 438 has a position corresponding to the neutral or inoperative position of the negative pendant gear unit 456 and the mechanism is in its home or full-cycle position.

Thus, depression of the print only key will cause a value entered from the keyboard into the selector mechanism to be printed, but will prevent the entry of this value into the accumulator mechanism of the machine so that the printing of the value does not affect the balance in the accumulator. This operation is useful for printing numbers carrying essential information, such as code numbers, but which are not to be included in the totals accumulated by the machine.

*Keyboard clearing cycle*

The keyboard clearing cycle is an obstructed addition cycle in which an addition cycle of the machine is established and completed but printing of the value standing in the selector mechanism and entry of this value into the accumulator mechanism is precluded.

Referring to Fig. 18, the stem 125 of the keyboard clear key 35 carries at its lower end a stud which rides on the forward portion of the upper edge of the left-hand leg 469 of the bail 468 and is effective to rock the bail leg 469 downwardly when the keyboard clear key is depressed. As explained above in connection with the repeat addition control cycle, rocking of the bail leg 469 downwardly rocks the right-hand leg 470 of the bail downwardly and this rocks the bellcrank lever 359 to move the link 358 forwardly and condition the mechanism for an addition cycle which is established by engagement of the stud 283 carried by the keyboard clear key stem 125 in the notch 281 in the left-hand clutch actuator bar 275, as has been previously described.

A bellcrank 612 extends longitudinally of the machine at the left-hand side of the machine and is pivotally mounted at its angle on a pivot pin 613 carried by the bracket 66. The lever 612 has an arm 614 extending upwardly and forwardly from the pin 613 and provided in its forward end with a notch 615 through which the stud 610 extends so that the lever 612 is rocked in a clockwise direction, as viewed in Fig. 18, when the keyboard clearing key is depressed. Lever 612 also has an arm 616 directed upwardly and rearwardly from the pivot pin 613 and provided at its rear end with an abutment formation 617 having a rear edge disposed substantially perpendicular to the longitudinal center line of the lever arm 616 and positioned adjacent the rearward edge of the print control cam 618 mounted on the left-hand portion of the cam shaft 238.

The printing operation of the printing mechanism of the machine is controlled by a print control bail, generally indicated at 620, having spaced-apart and substantially parallel legs, as indicated at 621, pivotally mounted at the open end of the bail on a bail supporting shaft 622 and having at the free ends of the legs a bail crossbar 623 which is disposed under the rearwardly extending tail portions of the print wheel carriers, as is fully disclosed in application S. N. 407,016 referred to above, to normally hold the print wheel carriers in non-printing position and to release them from printing movement during the interval in which the actuator sectors are temporarily retained at the bottom end of their downward stroke, as has been explained above. A bellcrank lever 625 is pivotally mounted at its angle on a pivot pin 626 disposed above the cam shaft 238 and has an arm 627 extending downwardly from the pin 626 and carrying at its lower end a cam following roller 628 which rides on the peripheral edge of the print control cam 613. The lever 625 also has an arm 630 extending rearwardly from the pin 626 alongside the left-hand leg 621 of the print bail 620 and adjustably connected to the arm 627 by an eccentric connection 631. The rear end portion of the upper edge of the arm 630 underlies a stud 632 which extends to the left from the left-hand bail leg 621 intermediate the length of this leg so that the bellcrank lever 625 controls the print controlling movements of the bail 620. The print control cam 618 has a low portion 634 of limited angular extent therein and this low portion comes into registry with the cam follower 628 at the time the actuator sectors reach the end of the downward movement during the first portion of the operating cycle of the machine. When the follower 628 drops into the dwell 634 of the cam 618, the bellcrank lever 625 is freed to rock in a counter-clockwise direction, as viewed in Fig. 18, thereby freeing the print control bail 620 to lower the bail crossbar 623 and thereby free the carriers of the set print wheels to descend and move the corresponding print wheels to printing position.

When the keyboard clear key 125 is depressed rocking the lever 612 in a clockwise direction, as described above, the abutment formation 617 is moved to a position of opposition to the front portion of the cam following roller 628 so that, when the low portion 634 of the cam 618 comes opposite the roller during the coincident operating cycle of the machine, the cam following roller strikes the abutment 617 and cannot drop into the low portion 634, the printing operation of the machine being thus blocked during the keyboard clearing cycle.

The paper tape on which the numbers are printed by the machine is extended around a platen 636 mounted on a platen shaft 637 disposed rearwardly of, above and parallel to the cam shaft 238, and the paper tape is fed in a step-by-step manner by mechanism including a ratchet wheel 638 mounted on the shaft 637 at one end of the platen and a ratchet pawl 640 mounted in the machine in substantially upright position at the rearward side of the ratchet wheel 638 for longitudinal movement and carrying at its upper end an ear 641 which engages with the teeth of the ratchet wheel 638 to impart an increment of rotational movement to the ratchet wheel 638 and the platen 636 each time the pawl 640 is moved downwardly. The pawl is mechanically connected to the actuator mechanism of the machine in a manner fully disclosed in application S. N. 407,016, referred to above, and is moved downwardly and then returned upwardly each time the actuator mechanism is operated coincident to an operating cycle of the machine.

A shaft 642 extends transversely of the machine below the shaft 637 and rearwardly of and parallel to the cam shaft 238 and a lever 643 is secured at one end to the left-hand end portion of this shaft 642 and extends downwardly and forwardly therefrom. An extension 644 of the rearward end of the arm 616 of the bellcrank lever 612 extends into overlapping relationship with the forward end of the lever 643 and carries a stud 645 received in a notch 646 in the free end of the lever 643 so that, when the shaft 612 is rocked in a clockwise direction by depression of the keyboard clear key, the lever 643 is rocked in a counter-clockwise direction, as viewed in Fig. 18, and imparts a rotational movement to the shaft 642. A lever 648 is mounted intermediate its length on the right-hand end portion of the shaft 642 and has an upwardly extending arm 649 overlapping the intermediate portion of the pawl 640 and engaging at its rearward edge a stud 650 projecting laterally from the intermediate portion of the pawl.

When the lever 643 is rocked in a counter-clockwise direction, as described above, the lever 648 is also rocked in a counter-clockwise direction and the rear edge of the arm 649 of this lever engages the stud 650 and moves the pawl 640 rearwardly to space the ear 641 from the teeth of the ratchet wheel 638 so that no increment of rotational movement will be imparted to the ratchet wheel when the pawl 640 is moved downwardly incident to the keyboard clearing cycle of the machine. Feeding of the paper tape is thus blocked during the keyboard clearing cycle.

A bellcrank lever 652 is pivotally mounted intermediate its length on the stud 279 which supports the rear end of the left-hand clutch actuating bar 275 and has an arm 653 extending forwardly from the stud 279 to a position in which its forward end overlaps the forward portion of the key stem 125 intermediate the length of this key stem. The forward end of the arm 653 is provided with a notch 654 which receives a stud 655 mounted on the key stem 125 so that the lever 652 is rocked in a clockwise direction, as viewed in Fig. 18, when the keyboard clear key 35 is depressed. The lever 652 also has an arm 656 extending downwardly and rearwardly from the stud 279 and the distal end of this arm 656 is provided with a rearward directed hook formation 657 which engages under the left-hand end portion of the gear shaft 375 of the positive pendant gear unit 370 when the lever 652 is rocked, as described above. Engagement of the hook 657 under the left-hand end portion of the gear shaft 375 positively holds the positive pendant gear unit 370 against movement to mesh the gears 381 thereof with the accumulator drive gears 390 and thus blocks entry of any value set up in the selection mechanism of the machine into the accumulator mechanism.

While depression of the keyboard clear key 35 thus establishes an addition cycle of the machine, because the printing mechanism, the tape feed mechanism and the accumulator entry mechanism are all blocked, the only effect of this cycle is to restore the selection unit sectors 305 to their "0" position and to restore the shiftable selection mechanism unit 198 to its right-hand or home position, thereby removing the entry value from the selection mechanism without printing such entry value or entering it into the accumulator mechanism of the machine. At the end of the keyboard clearing cycle, the keyboard clear key 35 is released, as explained above, and the machine parts are all restored to their full-cycle position and are ready for the entry of a new value into the selection mechanism or for the taking of a subtotal or total, as described above.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. In a calculating machine having selection mechanism, printing mechanism, accumulator mechanism, actuator mechanism drivingly connected to said printing mechanism, cyclically operating power means effective to impart successive operating cycles to said actuator mechanism, and print timing mechanism and tape feeding mechanism driven by said power means, control means comprising manually depressible control keys each effective when depressed to establish an operating cycle of said power means and including a keyboard clearing key, mechanism conditioned by depression of said keyboard clearing key to connect said actuator mechanism to said selection mechanism to zeroize said selection mechanism during the first portion of the coincident operating cycle, and mechanical components moved by depression of said keyboard clearing key into position to block the operation of said print timing mechanism and said tape feeding mechanism and to block the connection of said actuator mechanism to said accumulator mechanism during the latter portion of the coincident machine operating cycle.

2. In a calculating machine having selection mechanism, printing mechanism, accumulator mechanism, actuator mechanism drivingly connected to said printing mechanism, and cyclically operating power means effective to impart successive operating cycles to said actuator mechanism, control means comprising manually depressible control keys effective upon depression thereof to establish an operating cycle of said power means and including a subtraction key, mechanism conditioned by said subtraction key and operated by said power means to drivingly connect said actuator mechanism to said selection mechanism during the first portion of a coincident machine operating cycle to zeroize said selection mechanism and transfer an entry value therein to said printing mechanism, and to connect said actuator mechanism to said accumulator mechanism during the latter portion of the coincident operating cycle to transfer the same entry value to said accumulator while said printing mechanism is zeroized, a print only key effective when depressed to condition the same mechanism conditioned by said subtraction key, and an element positioned by depression of said print only key to block connection of said actuator mechanism to said accumulator mechanism during the latter portion of the coincident operating cycle to thereby preclude entry of the printed value into said accumulator mechanism.

3. In a calculating machine having selection mechanism, printing mechanism, accumulator mechanism, actuator mechanism drivingly connected to said printing mechanism, cyclically operating power means effective to impart successive operating cycles to said actuator mechanism, and print timing and tape feeding mechanism driven by said power means in timed relationship to the operation of said actuator mechanism, control means comprising a plurality of manually depressible keys each effective upon depression thereof to establish an operating cycle of said power means and including an addition key, mechanism conditioned by depression of said addition key and actuated by said power means to connect said actuator mechanism with said selector mechanism during the first portion of a coincident operating cycle of said actuator mechanism to restore said selector mechanism to its full-cycle position and condition and transfer an entry value standing therein to said printing mechanism and to connect said actuator mechanism to said accumulator mechanism during the latter portion of the coincident operating cycle of said actuator mechanism to enter the value in said accumulator mechanism while said printing mechanism is zeroized, a keyboard clear key effective when depressed to condition the same mechanism conditioned by depression of said addition key, and movable elements positioned by depression of said keyboard clear key to block operation of said print timing and said tape feeding mechanism and to block connection of said actuator mechanism to said accumulator mechanism to thereby limit the operations accomplished during an operating cycle established by depression of said keyboard clear key to the restoration of said selector mechanism to its full-cycle position and condition.

4. A calculating machine comprising a ten-key keyboard, a pin carriage shiftable step by step from right to left by operation of said keyboard and including stop pins set in accordance with the digit values of actuated keyboard keys, ordinally arranged selection sectors carrying check dials and spring-urged from their "0" toward their "9" positions and stopped in differentially set positions by the keyboard set stop pins, zero latch means engaging said selection sectors to hold the latter in "0" position and sequentially released by said keyboard keys to free the co-ordinal selection sectors for spring-urged movement to differential setting as determined by the set stop pins of said pin carriage, cyclically operating power means, pin carriage restore mechanism operated by said power means to restore said pin carriage and stop pins to full-cycle position, printing mechanism, an accumulator, actuating mechanism including ordinal actuator sectors moved by said power means from their full-cycle position to differentially set positions and back to their full-cycle position during each operating cycle of said power means and addition gear mechanism drivingly connected to said printing mechanism and moved by said power means during the former portion of an operating cycle into engagement with the co-ordinal selection sectors to read out a value from the differentially set selection sectors while restoring the latter to their "0" position in which they are latched by said zero latches, read the value read out of said selection sectors into said printing mechanism and control the differential setting of said actuating sectors, said gear mechanism being effective during the latter portion of the coincident operating cycle to zeroize said printing mechanism and being spring-urged into driving engagement with said accumulator upon mid-cycle release thereof by said power means to transfer the value read into said actuator sectors by the differential setting thereof to said accumulator as said actuator sectors are returned to their full-cycle position, an addition key and addition control mechanism actuated by manual depression of said addition key to establish an operating cycle of said power means and condition said power means to move said addition gear mechanism into engagement with said selection sectors during the former portion of the operating cycle and release said gear mechanism at mid-cycle for spring-urged movement into driving engagement with said accumulator during the latter portion of the coincident operating cycle, a repeat addition key effective when manually depressed to actuate said addition control mechanism, a zero latch blocking member set by depression of said repeat addition key to disable said zero latches to relatch said selection sectors in "0" position, and means operated by depression of said repeat addition key to disable said pin carriage restore mechanism to return said pin carriage to its right-hand home position.

5. A calculating machine comprising a ten-key keyboard a pin carriage shiftable step by step from right to left by operation of said keyboard and including stop pins set in accordance with the digit values of actuated keyboard keys, ordinally arranged selection sectors carrying check dials and spring-urged from their "0" toward their "9" positions and stopped in differentially set positions by the keyboard set stop pins, zero latch means engaging said selection sectors to hold the latter in "0" position and sequentially released by said keyboard keys to free the co-ordinal selection sectors for spring-urged movement to differential setting as determined by the set stop pins of said pin carriage, cyclically operating power means, pin carriage restore mechanism operated by said power means to restore said pin carriage and stop pins to full-cycle position, printing mechanism, an accumulator, actuating mechanism including ordinal actuator sectors moved by said power means from their full-cycle position to differentially set position and back to their full-cycle position during each operating cycle of said power means and addition gear mechanism drivingly connected to said printing mechanism and moved by said power means during the former portion of an operating cycle into engagement with the co-ordinal selection sectors to read out a value from the differentially set selection sectors while restoring the latter to their zero position in which they are latched by said zero latches, read the value read out of said selection sectors into said printing mechanism and control the differential setting of said actuating sectors, said gear mechanism being effective during the latter portion of the coincident operating cycle to zeroize said printing mechanism and being spring-urged into driving engagement with said accumulator upon mid-cycle release thereof by said power means to transfer the value read into said actuator sectors by the differential setting thereof to said accumulator as said actuating sectors are returned to their full-cycle position, an addition key and addition control mechanism actuated by manual depression of said addition key to establish an operating cycle of said power means and condition said power means to move said addition gear mechanism into engagement with said selection sectors during the former portion of the operating cycle and release said gear mechanism at mid-cycle for spring-urged movement into driving engagement with said accumulator during the latter portion of the coincident operating cycle, a repeat addition key effective when manually depressed to actuate said addition control mechanism, a zero latch blocking member set by depression of said repeat addition key to disable said zero latches to relatch said selection sectors in "0" position, a total key and a sub-total key, and means blocking operation of said total and sub-total keys while said pin carriage is away from its right-hand home position.

6. A calculating machine comprising a ten-key keyboard, a pin carriage shiftable step by step from right to left by operation of said keyboard and including stop pins set in accordance with the digit values of actuated keyboard keys, ordinally arranged selection sectors carrying check dials and spring-urged from their "0" toward their "9" positions and stopped in differentially set positions by the keyboard set stop pins, zero latch means engaging said selection sectors to hold the latter in "0" position and sequentially released by said keyboard keys to free the co-ordinal selection sectors for spring-urged movement to differential setting as determined by the set stop pins of said pin carriage, cyclically operating power means, pin carriage restore mechanism operated by said power means to restore said pin carriage and stop pins to full-cycle position, printing mechanism, an accumulator, actuating mechanism including ordinal actuator sectors moved by said power means from their full-cycle position to differentially set positions and back to their full-cycle position during each operating cycle of said power means and addition gear mechanism drivingly connected to said printing mechanism and moved by said power means during the former portion of an operating cycle into engagement with the co-ordinal selection sectors to read out a value from the differentially set selection sectors while restoring the latter to their "0" position in which they are latched by said zero latches, read the value read out of said selection sectors into said printing mechanism and control the differential setting of said actuating sectors, said gear mechanism being effective during the latter portion of the coincident operating cycle to zeroize said printing mechanism and being spring-urged into driving engagement with said accumulator upon mid-cycle release thereof by said power means to transfer the value read into said actuator sectors by the differential setting thereof to said accumulator as said actuating sectors are returned to their full-cycle position, an addition key and addition control mechanism actuated by manual depression of said addition key to establish an operating cycle of said power means and condition said power means to move said addition gear mechanism into engagement with said selection sectors during the former portion of the operating cycle and release said gear mechanism at mid-cycle for spring-urged movement into driving engagement with said accumulator during the latter portion of the coincident operating cycle, a repeat addition key effective when manually depressed to actuate said addition control mechanism, a zero latch blocking member set by depression of said repeat addition key to disable said zero latches to relatch said selection sectors in "0" position, and a live point pivotally mounted on each of said selection sectors, each of said zero latches comprising a lever pivotally mounted on said pin carriage and engageable with the live point of the co-ordinal selection sector to hold the sector in "0" position and consecutively moved by said keyboard keys out of engagement with the corresponding live points to consecutively free said selection sectors for spring-urged movement to differentially set positions as said pin carriage and selection sectors are stepped to the left from their right-hand home position, and said zero latch blocking member comprising a bail engageable with the zero latch levers which have been stepped to the left of the home position of the highest order selection sector and effective to raise these zero latch levers to a position at which they cannot reengage the live points on the co-ordinal selection sectors.

7. A calculating machine comprising a ten-key keyboard, a pin carriage shiftable step by step from right to left by operation of said keyboard and including stop pins set in accordance with the digit values of actuated keyboard keys, ordinally arranged selection sectors carrying check dials and spring-urged from their "0" toward their "9" positions and stopped in differentially set positions by the keyboard set stop pins, zero latch means engaging said selection sectors to hold the latter in "0" position and sequentially released by said keyboard keys to free the co-ordinal selection sectors for spring-urged movement to differential setting as determined by the set stop pins of said pin carriage, cyclically operating power means, pin carriage restore mechanism operated by said power means to restore said pin carriage and stop pins to full-cycle position, printing mechanism, an accumulator, actuating mechanism including ordinal actuator sectors moved by said power means from their full-cycle position to differentially set positions and back to their full-cycle position during each operating cycle of said power means and addition gear mechanism drivingly connected to said printing mechanism and moved by said power means during the former portion of an operating cycle into engagement with the co-ordinal selection sectors to read out a value from the differentially set selection sectors while restoring the latter to their "0" position in which they are latched by said zero latches, read the value read out of said selection sectors into said printing mechanism and control the differential setting of said actuating sectors, said gear mechanism being effective during the latter portion of the coincident operating cycle to zeroize said printing mechanism and being spring-urged into driving engagement with said accumulator upon mid-cycle release thereof by said power means to transfer the value read into said actuator sectors by the differential setting thereof to said accumulator as said actuating sectors are returned to their full-cycle position, an addition key and addition control mechanism actuated by manual depression of said addition key to establish an operating cycle of said power means and condition said power means to move said addition gear mechanism into engagement with the said selection sectors during the former portion of the operating cycle and release said gear mechanism at mid-cycle for spring-urged movement into driving engagement with said accumulator during the latter portion of the coincident operating cycle, a repeat addition key effective when manually depressed to actuate said addition control mechanism, a zero latch blocking member set by depression of said repeat addition key to disable said zero latches to relatch said selection sectors in "0" position, said pin carriage restore mechanism comprising a bell-crank lever pivotally mounted intermediate its length on a fixed pivot and connected at one end to said pin carriage, a member rotated by said power means and carrying an eccentrically disposed abutment element and a link pivotally connected at one end to the other end of said bellcrank lever and provided at its other end with an abutment formation engageable by said abutment element to pull on said link and rock said bellcrank lever in a direction to move said pin carriage from left to right, and said means for disabling said restore means comprising a lever connected at one end to said link and at its other end to said repeat addition key to move the abutment formation on said link out of the path of said abutment element when said repeat addition key is depressed.

8. A calculating machine comprising a ten-key keyboard, a pin carriage shiftable step by step from right to left by operation of said keyboard and including stop pins set in accordance with the digit values of actuated keyboard keys, ordinally arranged selection sectors carrying check dials and spring-urged from their "0" toward their "9" positions and stopped in differentially set positions by the keyboard set stop pins, zero latch means engaging said selection sectors to hold the latter in "0" position and sequentially released by said keyboard keys to free the co-ordinal selection sectors for spring-urged movement to differential setting as determined by the set stop pins of said pin carriage, cyclically operating power means, pin carriage restore mechanism operated by said power means to restore said pin carriage and stop pins to full-cycle position, printing mechanism, an accumulator, actuating mechanism including ordinal actuator sectors moved by said power means from their full-cycle position to differentially set positions and back to their full-cycle position during each operating cycle of said power means and addition gear mechanism drivingly connected to said printing mechanism and moved by said power means during the former portion of an operating cycle into engagement with the co-ordinal selection sectors to read out a value from the differentially set selection sectors while restoring the latter to their "0" position in which they are latched by said zero latches, read the value read out of said selection sectors into said printing mechanism and control the differential setting of said actuating sectors, said gear mechanism being effective during the latter portion of the coincident operating cycle to zeroize said printing mechanism and being spring-urged into driving engagement with said accumulator upon mid-cycle release thereof by said power means to transfer the value read into said actuator sectors by the differential setting thereof to said accumulator as said actuating sectors are returned to their full-cycle position, an addition key and addition control mechanism actuated by manual depression of said addition key to establish an operating cycle of said power means and condition said power means to move said addition gear mechanism into engagement with said selection sectors during the former portion of the operating cycle and release said gear mechanism at midcycle for spring-urged movement into driving engagement with said accumulator during the latter portion of the coincident operating cycle, a repeat addition key effective when manually depressed to actuate said addition control mechanism, a zero latch blocking member set by depression of said repeat addition key to disable said zero latches to relatch said selection sectors in "0" position, a keyboard clearing key effective when manually depressed to actuate said addition key mechanism, a first blocking member set by depression of said keyboard clearing key to engage said gear mechanism when the latter is released by said power means to restrain said gear mechanism against movement into engagement with said accumulator and a second blocking member set by depression of said keyboard clearing key to block operation of said printing mechanism, whereby the value in said selection mechanism will be printed and the printing mechanism will be cleared out without printing the entry value or entering it in said accumulator.

9. In a calculating machine having selection mechanism, accumulator mechanism, cyclically operating power means, actuator mechanism, printing mechanism, transmission means, power operated means effective to move said transmission means to interconnect said selection mechanism, said actuator mechanism and said printing mechanism during the former portion of an operating cycle of said power means and to interconnect said actuator mechanism, said printing mechanism and said accumulator during the lattter portion of an operating cycle of said power means, an addition key, addition key actuated mechanism effective to establish an additive operating cycle of said power means in which said power operated means is conditioned by said addition key actuated mechanism to move said transmission means to first connect said actuator mechanism and printing mechanism to said selection mechanism and subsequently connect said actuator mechanism additively to said accumulator while maintaining a driving connection between said actuator mechanism and said printing mechanism, and power operated restore means effective to restore said selection mechanism to its full-cycle position at the end of each operating cycle of said power means, a repeat addition key effective to actuate said addition key actuated mechanism to establish successive additive operating cycles of said power operated means, and means actuated by said repeat addition key disabling said power operated restore means to restore said selection mechanism to full-cycle position.

10. In a calculating machine having selection mechanism, printing mechanism, accumulator mechanism, cyclically operating power means, actuator mechanism including actuator sectors movable by said power means from full-cycle position to differentially set positions and back to full-cycle position, an addition gear assembly drivingly connected to said printing mechanism and movable by said power means during the former portion of a machine operating cycle into engagement with said selection mechanism to control the differential setting of said actuator sectors and set said printing mechanism to the entry value in said selection mechanism, said addition gear assembly being effective during the latter portion of a machine operating cycle while said actuator sectors are being restored to their full-cycle position, to zeroize said printing mechanism and being spring-urged during the latter portion of a machine operating cycle into engagement with said accumulator, first lock means releasably holding said addition gear assembly out of engagement with said accumulator, a subtraction gear assembly drivingly engaged by said actuator sectors and spring-urged into engagement with said accumulator, second lock means releasably holding said subtraction gear assembly out of engagement with said accumulator, a subtraction key, mechanism operated by said subtraction key to establish an operating cycle of said power means and release said second lock means during the latter portion of a machine operating cycle while maintaining said first lock means in operation, a print only key effective to operate the mechanism operated by said subtraction key to establish a subtractive machine operating cycle, and blocking means set by operation of said print only key to hold said subtraction gear assembly against engaging said accumulator when said second lock means is released, whereby the value in said selection mechanism will be printed and said printing mechanism zeroized but the value will not be entered into said accumulator.

11. In a calculating machine having selection mechanism, power operated printing mechanism, an accumulator, cyclically operating power means, actuator mechanism driven by said power means and drivingly connected to said printing mechanism, and power positionable means effective to connect said actuator mechanism and said selection mechanism during the former portion of an operating cycle of said power means and to additively or subtractively connect said actuator mechanism to said accumulator during the latter portion of an operating cycle of said power means, a subtraction key, mechanism actuated by said subtraction key to establish an operating cycle of said power means and condition said power positionable means to connect said actuator mechanism subtractively to said accumulator during the latter portion of the coincident operating cycle, a print only key effective to operate said mechanism actuated by said subtraction key, and blocking means actuated by said print only key to disable said power positionable means to interconnect said actuator mechanism and said accumulator during the latter portion of an operating cycle established by operation of said print only key.

12. In a calculating machine having selection mechanism, power operated printing mechanism, an accumulator, cyclically operating power means, actuator mechanism driven by said power means and drivingly connected to said printing mechanism, and power positionable means effective to connect said actuator mechanism and said selection mechanism during the former portion of an operating cycle of said power means and to additively or subtractively connect said actuator mechanism to said accumulator during the latter portion of an operating cycle of said power means, an addition key, mechanism operated by said addition key to establish an operating cycle of said power means and condition said power positionable means to connect said actuator mechanism additively to said accumulator during the latter portion of the coincident operating cycle, a keyboard clearing key effective to operate the addition key operated mechanism, and means operated by said keyboard clearing key to disable said printing mechanism and to disable said power positionable means to connect said actuator mechanism to said accumulator during the latter portion of an operating cycle established by operation of said keyboard clearing key.

13. In a calculating machine having selection mechanism, an accumulator, cyclically operating power means, actuator mechanism driven by said power means, and power positionable means effective to connect said actuator mechanism and said selection mechanism during the former portion of an operating cycle of said power means and to additively or subtractively connect said actuator mechanism to said accumulator during the latter portion of an operating cycle of said power means, a first control key, mechanism operated by said first control key to establish an operating cycle of said power means and condition said power positionable means to connect said actuator mechanism to said accumulator during the latter portion of the coincident operating cycle, a second control key effective to actuate the same mechanism actuated by said first control key, and blocking means operated by said second control key to disable said power positionable means to connect said actuator to said accumulator during the latter portion of an operating cycle established by operation of said second control key.

14. In a calculating machine having selection mechanism, power operated printing mechanism, an accumulator, cyclically operating power means, actuator mechanism driven by said power means and drivingly connected to said printing mechanism, and power positionable means effective to connect said actuator mechanism and said selection mechanism during the former portion of an operating cycle of said power means and to additively or subtractively connect said actuator mechanism to said accumulator during the latter portion of an operating cycle of said power means, control keys, mechanism operated individually by said control keys to establish operating cycles of said power means and selectively condition said power positionable means to connect said actuator mechanism to said accumulator for additive or subtractive operation of said accumulator, a print only key effective to actuate the mechanism actuated by one of said control keys to establish an operating cycle of said power means, blocking means operated by said print only key to disable said power positionable means to connect said actuator mechanism to said accumulator during an operating cycle established by said print only key, a keyboard clear key effective to actuate the mechanism actuated by one of said control keys to establish an operating cycle of said power means, and blocking means operated by said keyboard clear key to disable said printing mechanism and also disable said power positionable means to connect said actuator mechanism to said accumulator during an operating cycle established by operation of said keyboard clear key.

15. In a calculating machine having selection mechanism including a shiftable carriage having a home position and being movable away from said home position during selection, power operated restore means for restoring said carriage to its home position, power operated printing mechanism, cyclically operating power means, actuator mechanism driven by said power means, an accumulator, and power positionable means effective when enabled to connect said actuator to said selection mechanism during the former portion and to said accumulator during the latter portion of an operating cycle of said power means, a control key, mechanism operated by said control key to establish an operating cycle of said power means and enable said power positionable means, a repeat key effective to operate the mechanism operated by said control key, and blocking means operated by said repeat key to disable said carriage restore means.

References Cited in the file of this patent
UNITED STATES PATENTS

| Number | Name | Date |
| --- | --- | --- |
| 1,050,845 | Pike | Jan. 21, 1913 |
| 1,876,719 | Mehan | Sept. 13, 1932 |
| 1,949,445 | Barrett | Mar. 6, 1934 |
| 1,983,625 | Luttropp | Dec. 11, 1934 |
| 2,034,345 | Kottmann | Mar. 17, 1936 |
| 2,107,445 | Klaar et al. | Feb. 8, 1938 |
| 2,330,689 | Crossman | Sept. 28, 1943 |
| 2,352,006 | Pott | June 20, 1944 |
| 2,424,359 | Liljestrom et al. | July 22, 1947 |
| 2,607,526 | Boyden et al. | Aug. 19, 1952 |
| 2,644,637 | Butler | July 7, 1953 |
| 2,675,960 | Frieberg et al. | Apr. 20, 1954 |
| 2,708,550 | Maier | May 17, 1955 |
| 2,710,139 | Swanson | June 7, 1955 |
| 2,733,858 | Anderson | Feb. 7, 1956 |